United States Patent [19]

Kun et al.

[11] Patent Number: 5,047,925
[45] Date of Patent: Sep. 10, 1991

[54] LOGICAL RING IN A VIRTUAL SINGLE MACHINE

[75] Inventors: Andrew I. Kun; Frank C. Kolnick, both of Willowdale, Canada; Bruce M. Mansfield, Kent, Wash.

[73] Assignee: Motorola, Inc., Schaumburg, Ill.

[21] Appl. No.: 183,469

[22] Filed: Apr. 15, 1988

Related U.S. Application Data

[63] Continuation of Ser. No. 730,923, May 6, 1985, abandoned.

[51] Int. Cl.$^5$ ............................................. G06F 15/16
[52] U.S. Cl. .................................... 364/200; 364/284; 364/284.3; 364/284.4
[58] Field of Search ... 364/200 MS File, 900 MS File; 340/825.05, 825.07, 825.08

[56] References Cited

U.S. PATENT DOCUMENTS

| | | | |
|---|---|---|---|
| 4,031,512 | 6/1977 | Faber | 364/200 |
| 4,374,409 | 2/1983 | Bienvenu et al. | 364/200 |
| 4,413,318 | 11/1983 | Herrington . | |
| 4,423,414 | 12/1983 | Bryant et al. | 340/825.07 |
| 4,430,651 | 2/1984 | Bryant et al. | 340/825.52 |

OTHER PUBLICATIONS

Sams, J. G., "Node Processor for Distributed System Control", IBM Technical Disclosure Bulletin, vol. 23, No. 5, 10/80, pp. 1811-1812.

Primary Examiner—Allen R. MacDonald
Assistant Examiner—Debra A. Chun
Attorney, Agent, or Firm—Walter W. Nielsen

[57] ABSTRACT

A multi-processor, multi-tasking virtual machine comprises processes, messages, and contexts. Processes communicate only through messages. Processes may be grouped into contexts of related processes. Communication may be made between processes in different or related contexts or at the same context level.

According to one message transmission mode, a message may be sent to each process with a given name within one context, thus ensuring that all processes with the same name at the same context level can be communicated with individually without knowing how many there are or where they are located.

13 Claims, 6 Drawing Sheets

LOGICAL RING IN A VIRTUAL SINGLE MACHINE

This application is a continuation of application Ser. No. 730,923, filed May 6, 1985, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED INVENTIONS

The present invention is related to the following inventions, filed on even date herewith, all assigned to the assignee of the present invention:

1. Title: Nested Contexts in a Virtual Single Machine
   Inventor: Andrew Kun
   Ser. No.: 730,903
6. Title: Computer System With Data Residence Transparency and Data Access Transparency
   Inventors: Bruce Mansfield, Frank Kolnick, and Andrew Kun
   Ser. No.: 730,929
7. Network Interface Module With Minimized Data Paths
   Inventors: Bernard Weisshaar and Michael Barnea
   Ser. No.: 730,621 now U.S. Pat. No. 4,754,395
8. Title: Method of Inter-Process Communication in a Distributed Data Processing System
   Inventors: Brude Weisshaar, Frank Kolnick, Andrew Kun, and Bruce Mansfield
   Ser. No.: 730,892 now U.S. Pat. No. 4,694,396
9. Title: Virtual Single Machine With Message-Like Hardware Interrupts and Processor Exceptions
   Inventors: Andrew Kun, Frank Kolnick, and Bruce Mansfield
   Ser. No.: 730,922

TECHNICAL FIELD

This invention relates generally to digital data processing, and, in particular, to an operating system facilitating the transmission of messages among processes.

BACKGROUND OF THE INVENTION

The present invention is implemented in a distributed data processing system—that is, two or more data processing systems which are capable of functioning independently but which are so coupled as to send and receive messages to and from one another.

A Local Area Network (LAN) is an example of a distributed data processing system. A typical LAN comprises a number of autonomous data processing "cells", each comprising at least a processor and memory. Each cell is capable of conducting data processing operations independently. In addition, each cell is coupled (by appropriate means such as a twisted wire pair, coaxial cable, fiber optic cable, etc.) to a network of other cells which may be, for example, a loop, star, tree, etc., depending upon the design considerations.

As mentioned above, the present invention finds utility in such a distributed data processing system, since there is a need in such a system for processes which are executing or which are to be executed in the individual cells to share data and to communicate data among themselves.

A "process", as used within the present invention, is defined as a self-contained package of data and executable procedures which operate on that data, comparable to a "task" in other known systems. Within the present invention a process can be thought of as comparable to a subroutine in terms of size, complexity, and the way it is used. The difference between processes and subroutines is that processes can be created and destroyed dynamically and can execute concurrently with their creator and other "subroutines".

Within a process, as used in the present invention, the data is totally private and cannot be accessed from the outside, i.e., by other processes. Processes can therefore by used to implement "objects", "modules", or other higher-level data abstractions. Each process executes sequentially. Concurrently is achieved through multiple processes, possibly executing on multiple processors.

Every process in the distributed data processing system of the present invention has a unique identifier (PID) by which it can be referenced. The PID is assigned by the system when the process is created, and it is used by the system to physically locate the process.

Every process also has a non-unique, symbolic "name", which is a variable-length string of characters. In general, the name of a process is known system-wide. To restrict the scope of names, the present invention utilizes the concept of a "context".

A "context" is simply a collection of related processes whose names are not known outside of the context. Contexts partition the name space into smaller, more manageable subsystems. They also "hide" names, ensuring that processes contained n them do not unintentionally conflict with those in other contexts.

A process in one context cannot explicitly communicate with, and does not known about, processes inside other contexts. All interaction across context boundaries must be through a "context process", thus providing a degree of security. The context process often acts as a switchboard for incoming messages, rerouting them to the appropriate sub-processes in its context.

A context process behaves like any other process and additionally has the property that any processes which it creates are known only to itself and to each other. Creation of the process constitutes definition of a new context with the same name as the process.

Any process can create context processes. Each new context thus defined is completely contained inside the context in which it was created and therefore is shielded from outside reference. This "nesting" allows the name space to be structured hierarchically to any desired depth.

Conceptually, the highest level in the hierarchy is the system itself, which encompasses all contexts. Nesting is used in top-down design to break a system into components or "layers", where each layer is more detailed than the preceding one. This is analogous to breaking a task down into subroutines, and in fact many applications which are single tasks on known systems may translate to multiple processes in nested contexts.

A "message" is a buffer containing data which tells a process what to do and/or supplies it with information it needs to carry out its operation. Each message buffer can have a different length (up to 64 kilobytes). By convention, the first field in the message buffer defines the type of message (e.g., "read", "print", "status", "event", etc.).

Messages are queued from one process to another by name of PID. Queuing avoids potential synchronization problems and is used instead of semaphores, monitors, etc. The sender of a message is free to continue after the message is sent. When the receiver attempts to get a message, it will be suspended until one arrives if none are already waiting in its queue. Optionally, the sender can specify that it wants to wait for a reply and is suspended until that specific message arrives. Messages from any other source are not dequeued until after that happens.

Within the present invention, messages are the only way for two processes to exchange data. There is no concept of a "global variable". Shared memory areas are not allowed, other than through processes which essentially "manage" each area by means of messages. Messages are also the only form of dynamic memory that the system handles. A request to allocate memory therefore returns a block of memory which can be used locally by the process but can also be transmitted to another process.

Messages provide the mechanism by which hardware transparency is achieved. A process located anywhere in the system may send a message to any other process anywhere else in the system (even on another processor) if it knows the process name. This means that processes can be dynamically distributed across the system at any time to gain optimal throughput without changing the processes which reference them. Resolution of destinations is done by searching the process name space. p The context nesting level determines the "scope of reference" when sending messages between processes by name. From a given process, a message may be sent to all processes at its own level (i.e., in the same context) and (optionally) to any arbitrary higher level. The contexts are searched from the current context upward until a match is found. All processes with the given name at that level are then sent a copy of the message. A process may also send a message to itself or to its parent (the context process) without knowing either name explicitly, permitting multiple instances of a process to exist in different contexts, with different names.

Sending messages by PID obviates the need for a name search and ignores context boundaries. This is the most efficient method of communicating.

There is a significant need to be able to provide within a data processing operating system the ability to easily pass messages among processes at the same level and having the same name. While it is known to provide the capability of sending messages between processes, it is presently not known to provide a "universal" message between a first process and all other related processes having the same name, without the first process knowing how many such other processes there are and where they are located.

BRIEF SUMMARY OF INVENTION

Accordingly, it is an object of the present invention to provide a data processing system having an improved operating system.

It is also an object of the present invention to provide an improved data processing system having an operating system which allows the easy transmission of messages within related groups of processes, or contexts.

It is another object of the present invention to provide an improved data processing system having an operating system which allows a first process to send a message to one or more other processes, wherein the other processes are related to the first process only through the fact that they share the same context and the same name.

These and other objects are achieved in accordance with a preferred embodiment of the invention by providing a method of communicating between processes in a data processing system comprising a plurality of processes, the method comprising the steps of grouping related processes into one or more contexts, each context having associated therewith a table identifying the location of each of its constituent processes; generating a request by a first process in one of the contexts to send a message to each process within the one context having the identical name, the location and quantity of such other processes within the context being unkown to the first process; searching the table associated with the one context to determine whether any other process is located within the one context having the name; and, if the one context contains one or more other processes having the same name, sending the message to each of the other processes at the locations indicated by the table for the other processes.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

OVERVIEW OF COMPUTER SYSTEM

Figure 1:
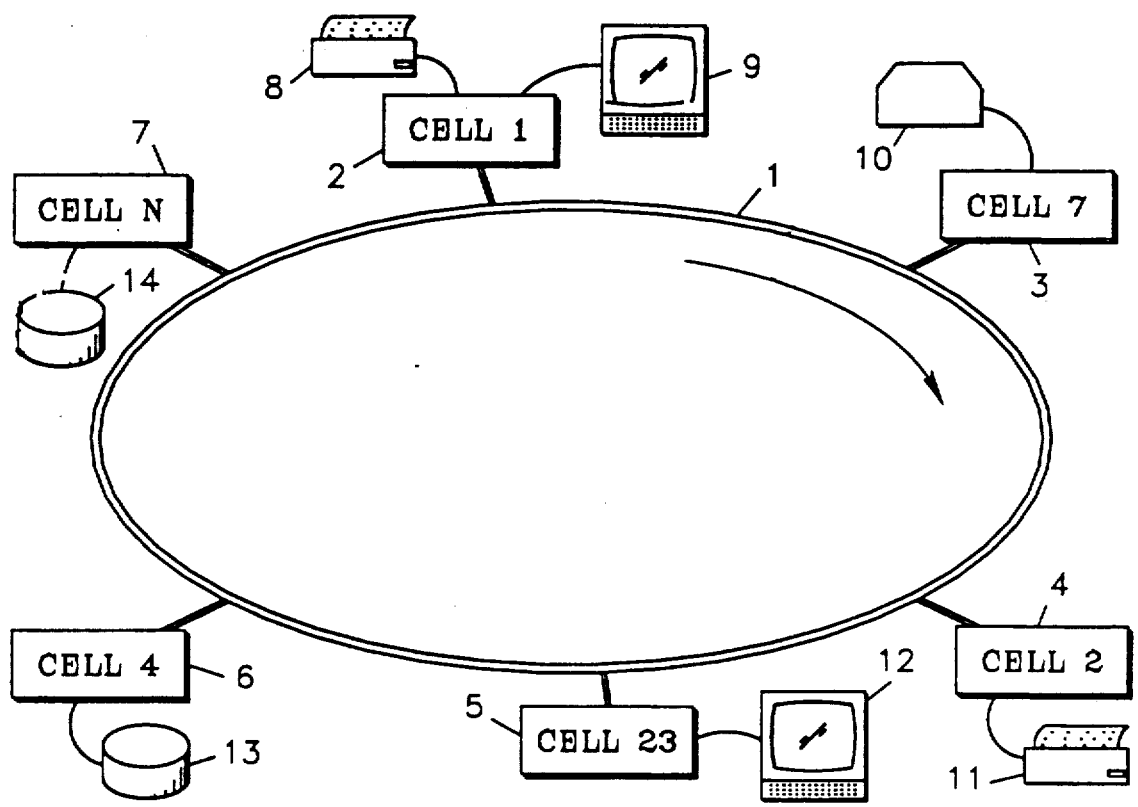
FIG. 1 shows a representational illustration of a single network, distributed data processing system incorporating the improved data management system of the present invention.

With reference to FIG. 1, a distributed computer configuration is shown comprising multiple cells 2-7 (nodes) loosely coupled by a local area network (LAN)

1. The number of cells which may be connected to the network is arbitrary and depends upon the user application. Each cell comprises at least a processor and memory, as will be discussed in greater detail with reference to FIG. 12 below. In addition, each cell may also include other units, such as a printer 8, operator display module (ODM) 9, mass memory module 13, and other I/O device 10.

Figure 2:
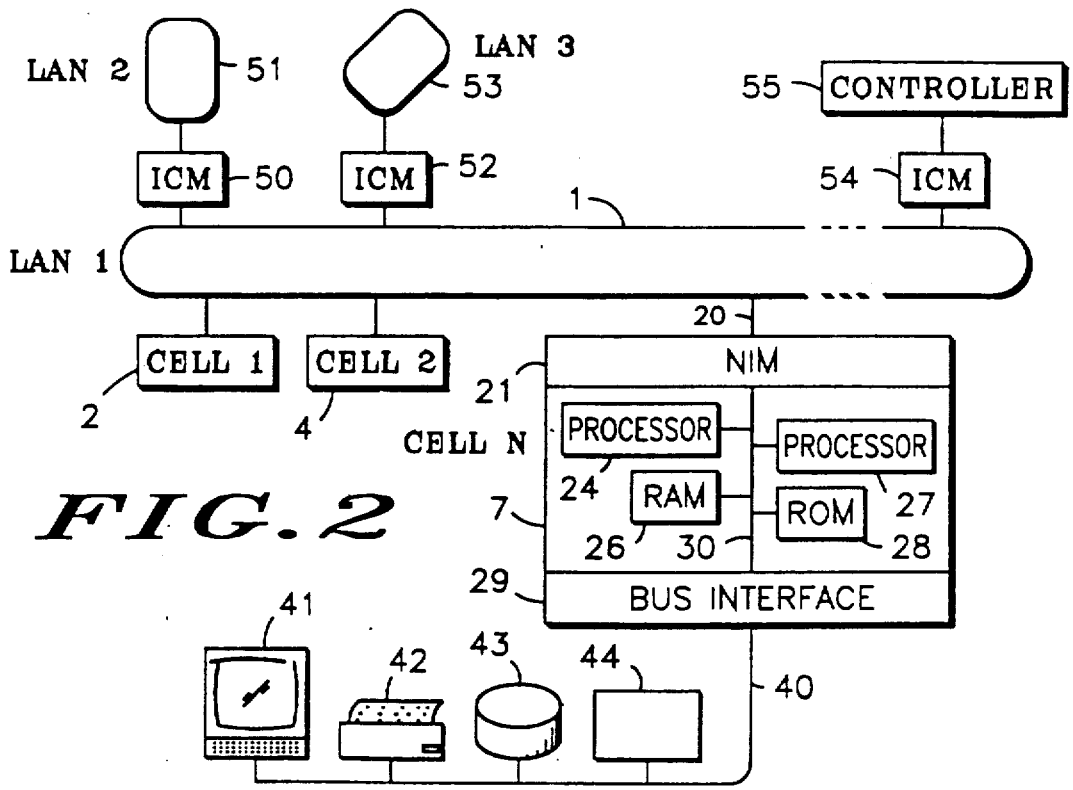
FIG. 2 shows a block diagram illustrating a multiple-network, distributed data processing system incorporating the improved data management system of the present invention.

With reference now to FIG. 2, a multiple-network distributed computer configuration is shown. A first local area network LAN 1 comprises several cells 2, 4, and 7. LAN 1 is coupled to a second local area network LAN 2 by means of an Intelligent Communications Module (ICM) 50. The Intelligent Communications Module provides a link between the LAN and other networks and/or remote processors (such as programmable controllers).

LAN 2 may comprise several cells (not shown) and may operate under the same LAN protocol as that of the present invention, or it may operate under any of several commercially available protocols, such as Ethernet; MAP, the Manufacturing Automation Protocol of General Motors Corp.; Systems Network Architecture (SNA) of International Business Machines, Inc.; SECS-II; etc. Each ICM 50 is programmable for carrying out one of the above-mentioned specific protocols. In addition, the basic processing module of the cell itself can be used as an intelligent peripheral controller (IPC) for specialized devices.

LAN 1 is additionally coupled to a third local area network LAN 3 via ICM 52. A process controller 55 is also coupled to LAN 1 via ICM 54.

A representative cell N (7, FIG. 2) comprises a processor 24 which, in a preferred embodiment, is a Motorola 68010 processor. Each cell further includes a read only memory (ROM) 28 and a random access memory (RAM) 26. In addition, each cell includes a Network Interface Module (NIM) 21, which connects the cell to the LAN, and a Bus Interface 29, which couples the cell to additional devices within a cell. While a minimal cell is capable of supporting two peripheral devices, such as an Operator Display Module (ODM) 41 and an I/O Module 44, additional devices (including additional processors, such as processor 27) can be provided within a cell. Other additional devices may comprise, for example, a printer 42, and a mass-storage module 43 which supports a hard disk and back-up device (floppy disk or streaming tape drive).

The Operator Display Module 41 provides a keyboard and screen to enable an operator to input information and receive visual information.

While a single cell may comprise all of the above units, in the typical user application individual cells will normally be dedicated to specialized functions. For example, one or more mass storage cells may be set up to function as data base servers. There may also be several operator consoles and at least one cell for generating hard-copy printed output. Either these same cells, or separate dedicated cells, may execute particular application programs.

The system is particularly designed to provide an integrated solution for factory automation, data acquisition, and other real-time applications. As such, it includes a full complement or services, such as a graphical output, windows, menus, icons, dynamic displays, electronic mail, event recording, and file management. Software development features include compilers, a window-oriented editor, a debugger, and performance-monitoring tools.

LOCAL AREA NETWORK

The local area network, as depicted in either FIG. 1 or FIG. 2, ties the entire system together and makes possible the distributed virtual machine model described below. The LAN provides high throughput, guaranteed response, reliability, and low entry cost. The LAN is also autonomous, in the sense that all system and applications software is unaware of its existence. For example, any Network Interface Module (e.g. NIM 21, FIG. 2) could be replaced without rewriting any software other than that which directly drives it.

The LAN interconnection medium may be twisted-pair or coaxial cable. Two channels (logically, two distinct networks) may be provided for reliability and for increased throughput.

The LAN architecture is a logical ring, in which an electronic "token" is constantly passed from cell to cell at high speed. The current holder of the token may use it to send a "frame" of data or may pass it on to the next cell in the ring. The NIM only needs to know the logical address and status of its immediately succeeding neighbor. The NIM's responsibility is limited to detecting the failure of that neighbor or the inclusion of a new neighbor. In general, adjustment to failed or newly added cells is automatic.

The network interface maps directly into the processor's memory. Data exchange occurs through a dual-ported buffer pool which contains a linked list of pending "frames". Logical messages, which vary in length, are broken into fixed-sized frames for transmission and are reassembled by the receiving NIM. Frames are sequence-numbered for this purpose. If a frame is not acknowledged within a short period of time, it is retransmitted a number of times before being treated as a failure.

As described above with reference to FIG. 2, the LAN may be connected to other LAN's operating under the same LAN protocol via so-called "bridgeways", or it may be connected to other types of LAN's via "gateways".

SOFTWARE MODEL

The computer operating system of the present invention operates upon processes, messages, and contexts, as such terms are defined herein. Thus this operating system offers the programmer a hardware abstraction, rather than a data or control abstraction.

Processes are referenced without regard to their physical location via a small set of message-passing primitives. As mentioned earlier, every process has both a unique system-generated identifier and a not necessarily unique name assigned by the programmer. The identifier provides quick direct access, while the name has a limited scope and provides symbolic, indirect access.

Figure 3:
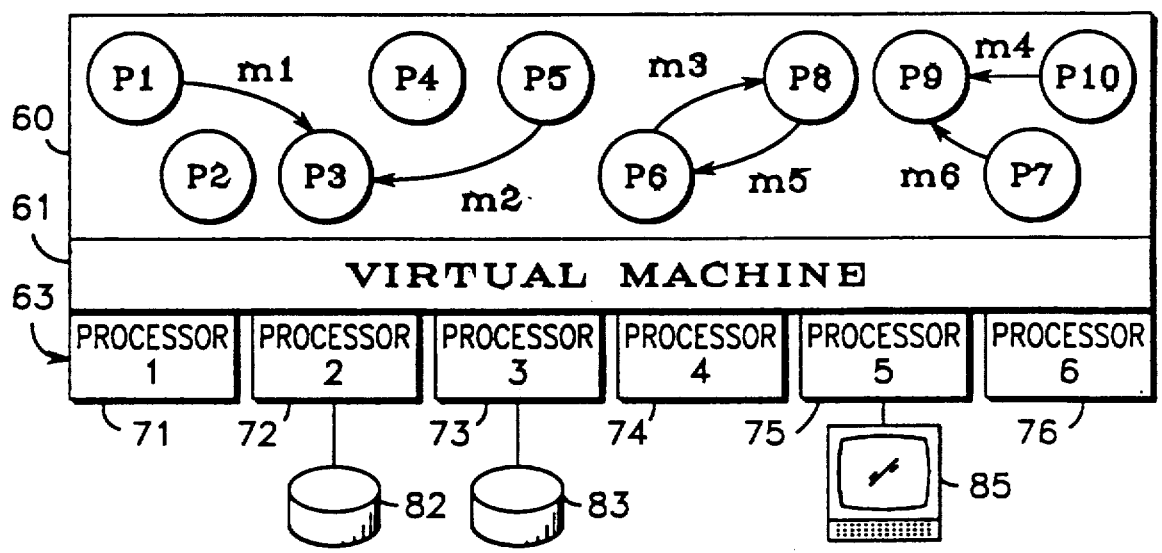
FIG. 3 shows an architectural model of a data processing system incorporating the present invention.

With reference to FIG. 3, an architectural model of the present invention is shown. The bottom, or hardware, layer 63 comprises a number of processors 71–76, as described below. The processors 71–76 may exist physically within one or more cells. The top, or software, layer 60 illustrates a number of processes P1–P10 which send messages m1–m6 to each other. The middle layer 61, labelled "virtual machine", isolates the hardware from the software, and it allows programs to be written as if they were going to be executed on a single processor. Conversely, programs can be distributed across multiple processors without having been explicitly designed for that purpose.

An important purpose of the virtual machine concept herein-disclosed is to provide the applications programmer with a simple, consistent model in which to design his system. This model, as mentioned above, is reduced to several elemental concepts: processes, messages, and contexts. As a consequence of this elemental model, hardware peculiarities are made transparent to the user, and changes in hardware configurations have no direct effect on the software.

THE VIRTUAL MACHINE

As discussed earlier, a "process" is a self-contained package of data and executable procedures which operate on that data. The data is totally private and cannot be accessed by other processes. There is no concept of shared memory within the present invention. Execution of a process is strictly sequential. Multiple processes execute concurrently and must be scheduled by the operating system. The processes can be re-entrant, in which case only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a "pointer" to a process.

Every process also has a "name" which is a variable-length string of characters assigned by the programmer. A name need not be unique, and this ambiguity may be used to add new services transparently and to aid in fault-tolerance.

Figure 4:
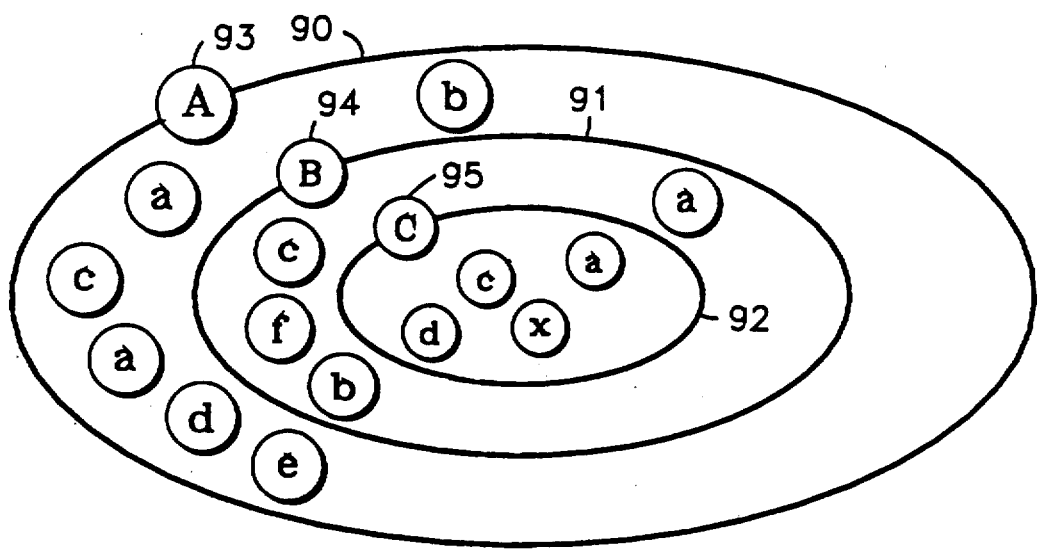
FIG. 4 shows the relationship between software contexts and processes as they relate to the present invention.

FIG. 4 illustrates that the system-wide name space is partitioned into distinct subsets by means of "contexts" identified by reference numerals 90-92. A context is simply a collection of related processes whose names are not known outside-of-the context. Context 90, for example, contains processes A, a, a, b, c, d, and e. Context 91 contains processes B, a, b, c, and f. And context 92 contains processes C, a, c, d, and x.

One particular process in each context, called the "context process", is known both within the context and within the immediately enclosing one (referred to as its "parent context"). In the example illustrated in FIG. 4, processes A-C are context processes for contexts 90-92, respectively. The parent context of context 91 is context 90, and the present context of context 92 is context 91. Conceptually, the context process is located on the boundary of the context and acts as a gate into it.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context process is to filter incoming messages and either reject them or reroute them to other processes in its context. Contexts may be nested, allowing a hierarchy of abstractions to be constructed. A context must reside completely on one cell. The entire system is treated as an all-encompassing context which is always present and which is the highest level in the hierarchy. In essence, contexts define localized protection domains and greatly reduce the chances of unintentional naming conflicts.

If appropriate, a process inside one context can be "connected" to one inside another context by exchanging PID's, once contact has been established through one or the other of the context processes. Most process servers within the present invention function that way. Initial access is by name. Once the desired function (such as a window or file) is "opened", the user process and the service communicate directly via PID's.

A "message" is a variable-length buffer (limited only by the processor's physical memory size) which carries information between processes. A header, inaccessible to the programmer, contains the destination name and the sender's PID. By convention, the first field in a message is a null-terminated string which defines the type of message (e.g., "read", "status", etc.) Messages are queued to the receiving process when they are sent. Queuing ensures serial access and is used in preference to semaphores, monitors, etc.

Messages provide the mechanism by which hardware transparency is achieved. A process located anywhere in the virtual machine can send a message to any other process if it knows its name. Transparency applies with some restrictions across bridgeways (i.e., the interfaces between LAN's operating under identical network protocols) and, in general, not at all across gateways (i.e., the interfaces between LAN's operating under different network protocols) due to performance degradation. However, they could so operate, depending upon the required level of performance.

Figure 5:
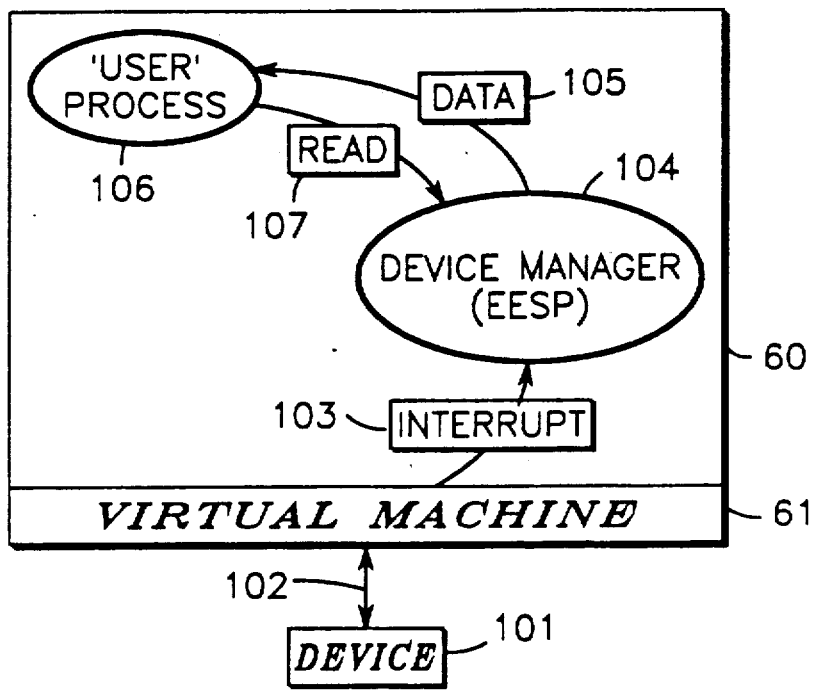
FIG. 5 shows the relationship between external events and processes.

With reference now to FIG. 5, the relationship of external events to processes will now be described. The virtual machine makes devices look like processes. For example, when an interrupt occurs in an external device 101, the virtual machine kernel 61 queues an interrupt message 103 to a specific process 104, known as an "external event service process" (EESP), functioning as the device manager. For efficiency, the message is pre-allocated once and circulates between the EESP and the kernel. The message contains just enough information to indicate the occurrence of the event. The EESP performs all hardware-specific functions related to the event, such as setting control registers, moving data 105 to a user process 106, transmitting "Read" messages from the user process 106, etc., and then "releasing" the interrupt.

To become an EESP, a process issues a "connect" primitive specifying the appropriate device register(s). It must execute a "disconnect" before it exits. Device-independence is achieved by making the message protocol between EESP's and applications processes the same wherever possible.

INTER-PROCESS COMMUNICATION

All inter-process communication is via messages. Consequently, most of the virtual machine primitives are concerned with processing messages. The virtual machine kernel primitives are the following:

ALLOC—request allocation of a (message) buffer of a given size.

FREE—request deallocation of a given message buffer.

PUT—send a message to a given destination (by name or PID).

GET—wait for and dequeue the next incoming message, optionally from a specific process (by PID).

FORWARD—pass a received message through to another process.

CALL—send a message, then wait for and dequeue the reply.

REPLY—send a message to the originator of a given message.

ANY_MSG—returns "true" if the receive queue is not empty, else returns "false"; optionally, checks if any messages from a specific PID are queued.

To further describe the function of the kernel primitives, ALLOC handles all memory allocations. It returns a pointer to a buffer which can be used for local storage within the process or which can be sent to another process (via PUT, etc.). ALLOC never "fails", but rather waits until enough memory is freed to satisfy the request.

The PUT primitive queues a message to another process. The sending process resumes execution as soon as the message is queued.

FORWARD is used to quickly reroute a message but maintain information about the original sender (whereas PUT always makes the sending process the originator of the message).

REPLY sends a message to the originator of a previously received message, rather than by name or PID.

CALL essentially implements remote subroutine invocations, causing the caller to suspend until the receiver executes a REPLY. Subsequently, the replied message is dequeued out of sequence, immediately upon arrival, and the caller resumes execution.

The emphasis is on concurrently, so that as many processes as possible are executed in parallel. Hence neither PUT nor FORWARD waits for the message to be delivered. Conversely, GET suspends a process until a message arrives and dequeues it in one operation. The ANY_MSG primitive is provided so that a process may determine whether there is anything of interest in the queue before committing itself to a GET.

Figure 6:
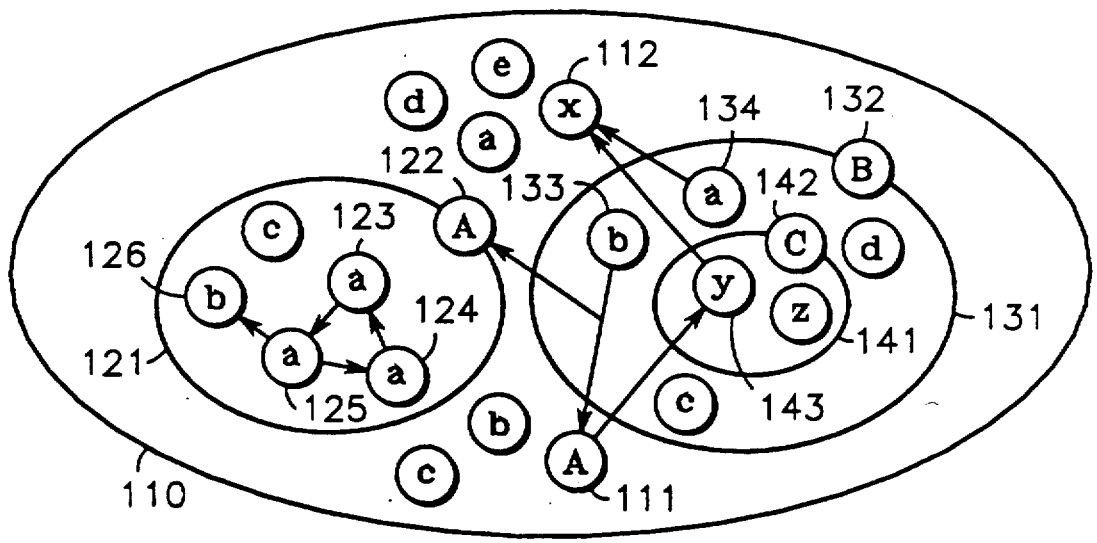
FIG. 6 shows how messages may be sent between processes within nested contexts.

When a message is sent by name, the destination process must be found in the name space. The search path is determined by the nesting of the contexts in which the sending process resides. From a given process, a message can be sent to all processes in its own context or (optionally) to those in any higher context. Refer to FIG. 6. The contexts are searched from the current one upward until a match is found or until the system context is reached. All processes with the same name in that context are then queued a copy of the message.

For example, with reference to FIG. 6, assume that in context 141 process y sends a message to ALL processes by the name x. Process y first searches within its own context 141 but finds no process x. The process y searches within the next higher context 131 (its parent context) but again finds no process x. Then process y searches within the next higher context 110 and finds a process x, identified by reference numeral 112. Since it is the only process x in context 110, it is the only recipient of the message from process y.

If process a in context 131 sends a message to ALL processes by the name x, it first searches within its own context 131 and, finding no processes x there, it then searches within context 110 and finds process x.

Assume that process b in context 131 sends a message to ALL processes by the name A. It would find process A (111) in context 110, as well as process A (122) which is the context process for context 121.

A process may also send a message to itself or to its context process without knowing either name explicitly.

The concept of a "logical ring" (analogous to a LAN) allows a message to be sent to the NEXT process in the system with a given name. The message goes to exactly one process in the sender's context, if such a process exists. Otherwise the parent context is searched.

The virtual machine guarantees that each NEXT transmission will reach a different process and that eventually a transmission will be sent to the logically "first" process (the one that sent the original message) in the ring, completing the loop. In other words, all processes with the same name at the same level can communicate with each other without knowing how many there are or where they are located. The logical ring is essential for distributing services such as a data base. The ordering of processes in the ring is not predictable.

For example, regarding FIG. 6, if process a (125) in context 121 sends a message to process a using the NEXT primitive, the search finds a first process a (124) in the same context 121. Process a (124) is marked as having received the message, and then process a (124) sends the message on to the NEXT process a (123) in context 121. Process a (123) is marked as having received the message, and then it sends the message on to the NEXT process a, which is the original sender process a (125), which knows not to send it further on, since it's been marked as having already received the message.

Sending messages directly by PID obviates the need for a name search and ignores context boundaries. This is known as the DIRECT mode of transmission and is the most efficient. For example, process A (111) sends a message in the DIRECT mode to process y in context 141.

If a process sends a message in the LOCAL transmission mode, it sends it only to a process having the given name in the sender's own context.

In summary, including the DIRECT transmission mode, there are five transmission modes which can be used with the PUT, FORWARD, and CALL primitives:

ALL—to all processes with the given name in the first context which contains that name, starting with the sender's context and searching upwards through all parent contexts.

LOCAL—to all processes with the given name in the sender's context only.

NEXT—to the next process with the given name in the same context as the sender, if any; otherwise it searches upwards through all parent contexts until the name is found.

LEVEL—sends to "self" (the sending process) or to "context" (the context process corresponding to the sender's context); "self" cannot be used with CALL primitive.

DIRECT—sent by PID.

Messages are usually transmitted by queueing a pointer to the buffer containing the message. A message is only copied when there are multiple destinations or when the destination is on another cell.

OPERATING SYSTEM

The operating system of the present invention consists of a kernel, which implements the primitives described above, plus a set of processes which provide process creation and termination, time management (set time, set alarm, etc.) and which perform cell start-up and configuration. Drivers for devices are also implemented as process (EESP's), as described above. This allows both system services and device drivers to be added or replaced easily. The operating system also supports swapping and paging, although both are invisible to applications software.

Until known distributed computer systems, that of the present invention does not use a distinct "name server" process to resolve names. Name searching is confined to the kernel, which has the advantage of being much faster.

A minimal bootstrap program resides permanently (in ROM) on every cell, e.g. ROM 28 in cell N of FIG. 2. The bootstrap program executes automatically when a cell is powered up and begins by performing basic on-board diagnostics. It then attempts to find and start an initial system code module which comprises the entire kernel, and EESP's for the clock, disk (if required), and NIM (if required). The module is sought on the first disk drive on the cell, if any. If there isn't a disk, and the cell is on the LAN, a message will be sent out requesting the module. Failing that, the required software must be resident in ROM. System services for the clock and for process creation, an initialization program, and a minimal file system, are also built into the module. The initialization program sets up all of the kernel's internal tables and then calls predefined entry points in each of the preloaded services (file management, etc.). The net result is that EESP's for the attached devices are scheduled to run, and the cell is available.

In general, there exists a template file describing the initial software and hardware for each cell in the system. The template defines a set of initial processes (usually one per service) which are scheduled immediately after the cell start-up. These processes then start up their respective subsystems. A cell configuration service on each cell sends configuration messages to each subsystem when it is being initialized, informing it of the devices it owns. Thereafter, similar messages are sent whenever a new device is added to the cell or a device fails or is removed from the cell.

Thus there is no well-defined meaning for "system up" or "system down"—as long as any cell is active, the system as a whole may be considered to be "up". Cells can be shut down or started up dynamically without affecting other cells on the network. The same principle applies, in a limited sense, to peripherals. Devices which can identify themselves with regard to type, model number, etc. can be added or removed without operator intervention. The operating system cannot maintain a global status of the system, nor does it attempt to centralize control of the entire system.

DATA MANAGEMENT

The present invention allows the user to store and retrieve data at several levels of abstraction. At various levels it provides device-independence, transparency, multiple views of the same data and support for transaction processing. Transparency means that a process need not know where a file is stored in order to access it. It also means that the file can be moved to another device without affecting the process. Only as many levels as are required for a particular application need by included in the system.

Figure 7:
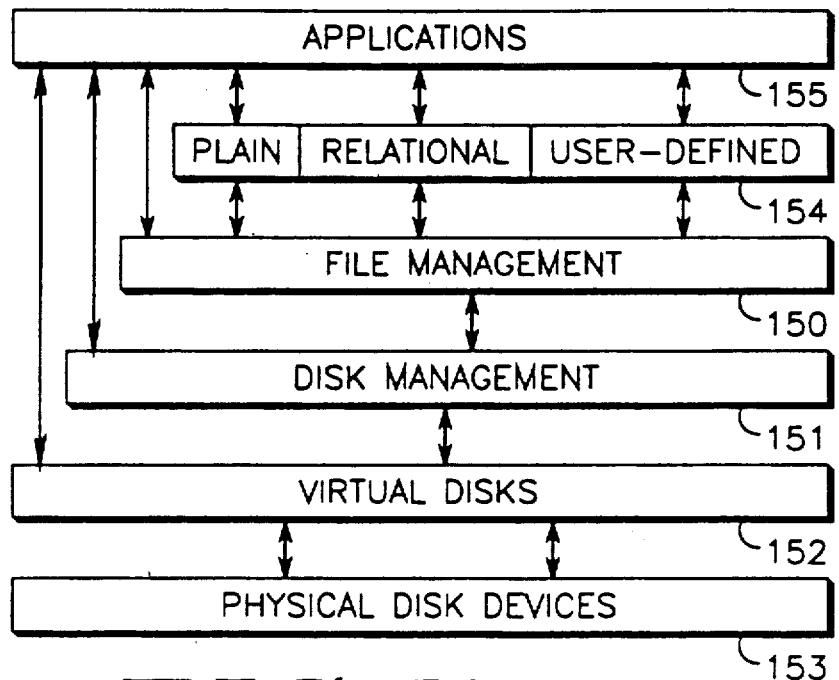
FIG. 7 shows an architectural model of the improved data management system incorporating the present invention.

Referring now to FIG. 7, the lowest level of data management is the physical disk layer 153, which is completely hidden from all applications software 155. Immediately above this level are virtual disks 152 which define an interface in terms of linear arrays of 1K blocks, regardless of the actual medium. Although the usual medium is disk, RAM may also be used (for temporary files) to improve performance. Three types of messages are supported at this level: "initial", to format the virtual disk, and "read" and "write" to access specific blocks.

The third level, disk management 151, organizes data within a virtual disk by means of indices. A disk index is a file at this level and is viewed as an extensible linear array of bytes. Messages are accepted to initialize the disk, allocate and delete indices, and read and write indices. The latter two functions operate starting at a given byte offset for a given byte length. An index is automatically extended when a request references a location outside the current limits. Physical storage is allocated only when data is actually written. Optional data caching is supported at the disk management level on a per cell basis.

File management 150 is layered on top of disk management 151 and introduces the concept of a "file system". A file system is a collection of named files (or named indices, in terms of the disk management layer 151). The name space constitutes a flat (single-level) directory which is allocated when the file system is initialized. A name may be up to 64 characters long and is hashed into the directory. Unnamed files are useful for building complex disk structures which are logically linked to each other, such as a hierarchical file directory or a database, or for temporary files which only the creator will use.

Transparency is supported only at the file management level 150 and above. It is used by simply omitting the file system name from the request (NEW, DELETE, RENAME, or OPEN). In this case, the request is forwarded through all file systems until the given file name is found.

The highest level 154 of data management deals in terms of "metaphors", which implement application-specific views of the data. A relational database is one example of a metaphor. Complex operations such as multi-user synchronization and record- or field-locking may be implemented at this level. The present invention supports two built-in views of the data: "plain" files, which are superficially equivalent to UNIX TM files, and a relational database.

Figure 8:
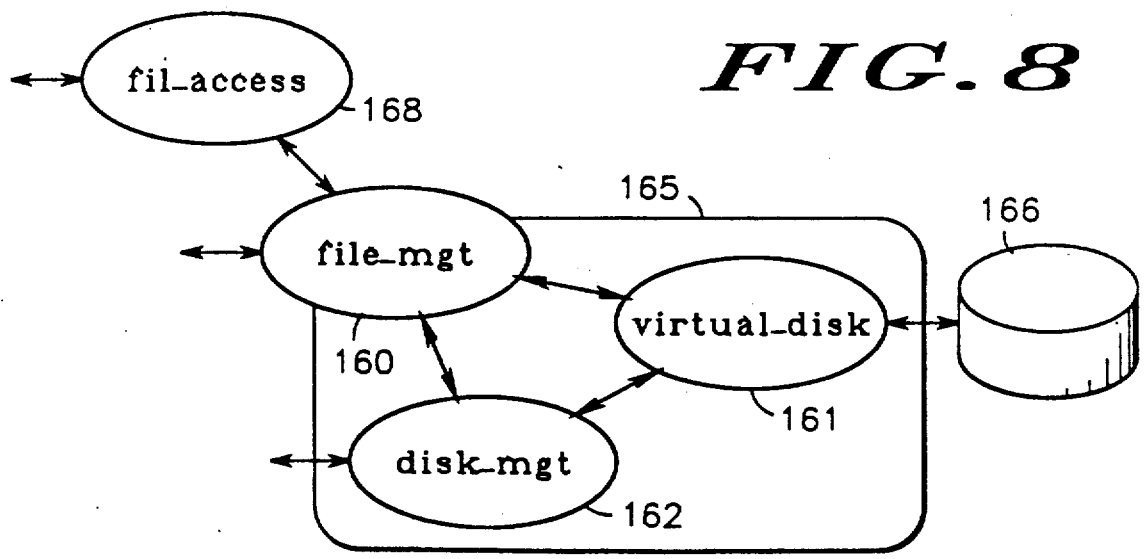
FIG. 8 shows an architectural software model of the improved data management system incorporating the present invention.

FIG. 8 illustrates the design of the data management software up to the plain-file level. Each active (mounted) filed system 165 is represented by a file management context 160. The set of all such contexts form a logical ring for purposes of message transmission; in other words, they all have the same name ("file.mgt"). The actual name of the file system (stored on the disk 166 at initialization) is known only to the context process.

In the plain-file metaphor, there is exactly one process for each open file, acting as a server for that file. That process (an instance of "fil.access") can be located in the appropriate file management context, or any application can create its own private copy of the process. The process allows standard file management functions (NEW, DELETE, RENAME, OPEN, and CLOSE) plus SEEK, LOCK (lock the entire file against access by processes other than the owner) and UNLOCK. Note that a given file process is only opened once, by its owner. If not locked, any other processes which known its name or PID can read and write the file. Protection is provided through normal process name-scoping. Protection via passwords or a similar mechanism are in general unsupported unless supported by another metaphor.

HUMAN INTERFACE

The human interface (HI) of the present invention provides a set of tools with which an end user can construct a package specific to his applications requirements. Such a package is referred to as a "metaphor", since it reflects the user's particular view of the system. Multiple metaphors can be supported concurrently. One representative metaphor is, for example, a software development environment.

The purpose of the HI metaphor is to allow consistent, integrated access to the data and functions available in the system. Since users' perceptions of the system are based largely on the way they interact with it, it is important to provide an interface with which they feel comfortable. The HI allows a systems designer to create a model consisting of objects that are familiar to the end user and a set of actions that can be applied to them.

The fundamental concept of the HI is that of the "picture". All visually-oriented information, regardless of interpretation, is represented by picture. A picture (such as a diagram, report, menu, icon, etc.) is defined in a device-independent format which is recognized and manipulated by all programs in the HI and all programs using the HI. It consists of "picture elements", such as "line", "arc", and "text", which can be stored compactly and transferred efficiently between processes. All elements have common attributes like color and fill pattern. Most also have type-specific attributes, such as typeface and style for text. Pictures are drawn in a large "world" co-ordinate system composed of "virtual pixels".

Because all data is in the form of pictures, segments of data can be freely copied between applications, e.g., from a live display to a word processor. No intermediate format or conversion is required. One consequence of this is that the end user or original equipment manufacturer (OEM) has complete flexibility in defining the formats of windows, menus, icons, error messages, help pages, etc. All such pictures are stored in a library rather than being built into the software and so are changeable at any time without reprogramming. A comprehensive editor is available to define and modify pictures on-line.

All interaction with the user's environment is through either "virtual input" or "virtual output" devices. A virtual input device accepts keyboards, mice, light pens, analog dials, pushbuttons, etc. and translates them into text, cursor-positioning, action, dial, switch, and number messages. All physical input devices must map into this set of standard messages. Only one process, an input manager for the specific device, is responsible for performing the translation. Other processes can then deal with the input without being dependent on its source.

Similarly, a virtual output manager translates standard output messages to the physical representation appropriate to a specific device (screen, printer, plotter, etc.) A picture drawn on any terminal or by a process can be displayed or printed on any device, subject to the physical limitations of that device.

Figure 9:
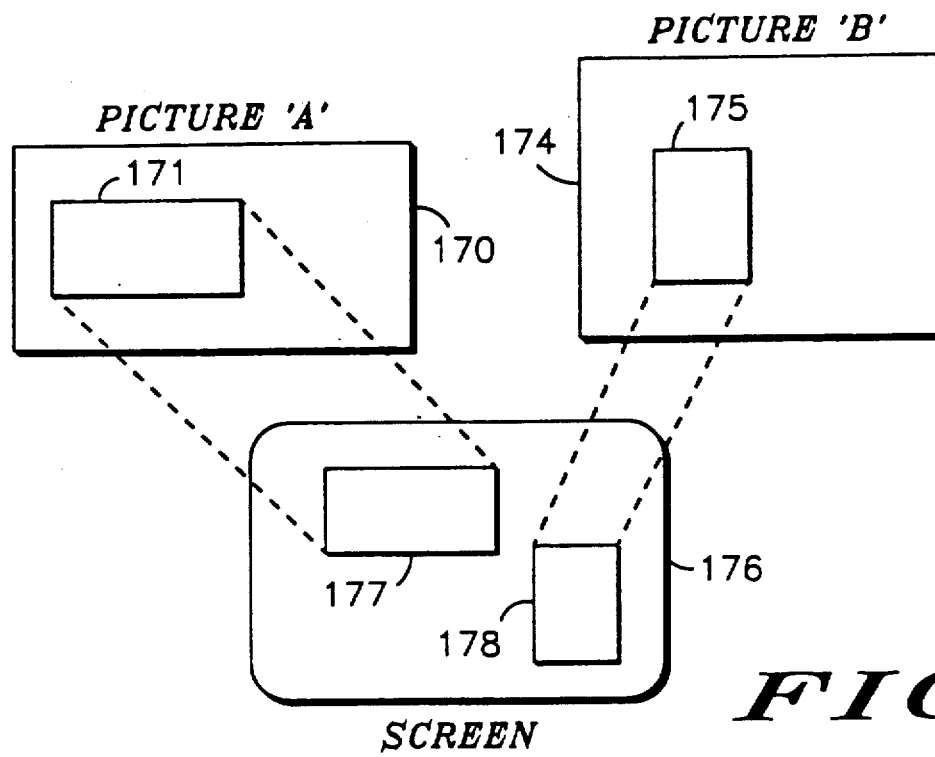
FIG. 9 shows the relationship between pictures, views, and windows in the human interface of a data processing system incorporating the present invention.

With reference to FIG. 9, two "pictures" are illustrated—picture A (170) and picture B (174).

The concept of a "view" is used to map a particular rectangular area of a picture to a particular device. In FIG. 9, picture A is illustrated as containing at least one view 171, and picture B contains at least one view 175. Views can be used, for example, to partition a screen for multiple applications or to extract page-sized subsets of a picture for printing.

If the view appears on a screen it is contained in a "window". With reference again to FIG. 9, view 171 of picture A is mapped to screen 176 as window 177, and view 175 of picture B is mapped as window 178.

The HI allows the user to dynamically change the size of the window, move the window around on the screen, and move the picture under the window to view different parts of it (i.e., scroll in any direction). If a picture which is mapped to one or more windows changes, all affected views of that picture on all screens are automatically updated. There is no logical limit to the number of sizes of windows on a particular screen. Since the system is distributed, it's natural for pictures and windows to be on different cells. For example, several alarm displays can share a single, common picture.

The primary mechanism for interacting with the HI is to move the cursor tot he desired object and "select" it by pressing a key or button. An action may be performed automatically upon selection or by further interaction, often using menus. For example, selecting an icon usually activates the corresponding application immediately. Selecting a piece of text is often followed by selection of a command such as "cut" or "underline". Actions can be dynamically mapped to function keys on a keyboard so that pressing a key is equivalent to selecting an icon or a menu item. A given set of cursors (the cursor changes as it moves from one application picture to another), windows, menus, icons, and function keys define a "metaphor".

The HI builds on the above concepts to provide a set of distributed services. These include electronic mail, which allows two or more users at different terminals in communicate with each other in real time or to queue files for later delivery, and a forms manage for data entry. A subclass of windows called "virtual terminals" provides emulation of standard commercially available terminals.

Figure 10:
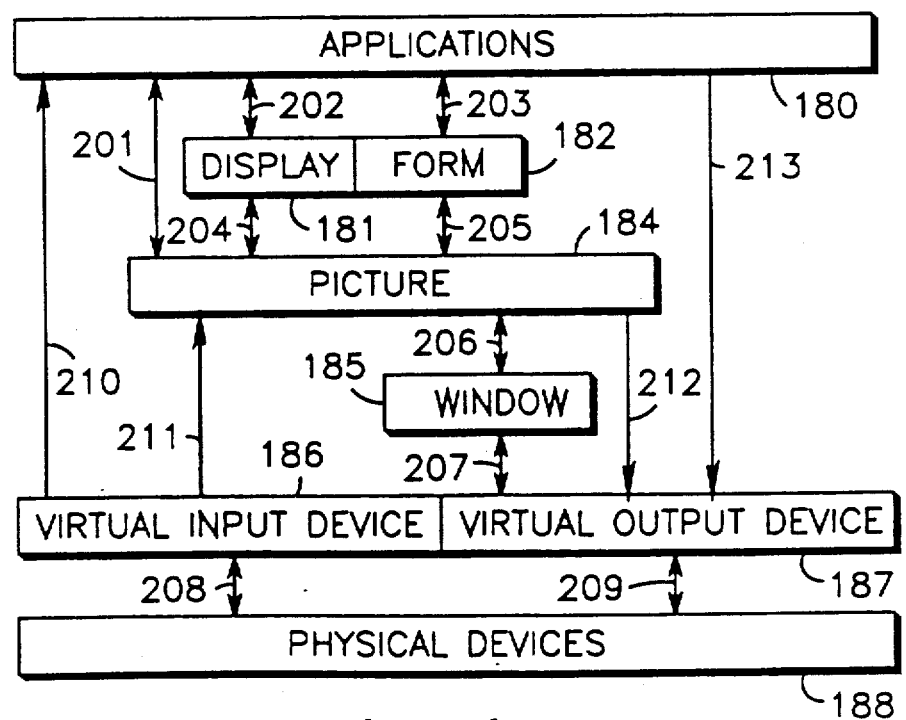
FIG. 10 shows a conceptual view of the different levels of human interface within a data processing system incorporating the present invention.

FIG. 10 shows the different levels of the HI and data flow through them. Arrows 201-209 indicate the most common paths, while arrows 210-213 indicate additional paths. The interface can be configured to leave out unneeded layers for customized applications. The philosophy behind the HI design dictates one process per object. That is, a process is created for each active window, picture, input or output device, etc. As a result, the processes are simplified and can be distributed across cells almost arbitrarily.

ERROR MANAGEMENT

An error management service is provided to catch errors and report them to the appropriate process(es). It serves a foundation upon which more sophisticated diagnostics and/or recovery schemes may be constructed. The system can intercept processor internal exceptions (bus and address errors, "trap" instructions, etc.), external exceptions (such as a spurious interrupts), device faults, and software-defined errors. The latter category is open-ended and comprises unexpected termination of a process, the result of a diagnostic program, or in general any error detected by the kernel or by any process. Failure to find the destination of a transmitted message is one example. While internal exceptions can be associated with the particular process which caused the error, external exceptions are independent, although they may directly impact one or more processes.

In summary, the prime functions of the error management service are to: (1) classify and log errors, (2) generate notification messages, (3) accept requests to configure the service and specify options, (4) accept software error messages from other subsystems, and (5) terminate affected processes, if required. Item (3) above allows applications and services to indicate that they want to know about specific errors or classes of errors. Options include automatic logging, automatic display on the operator's terminal, automatic suspension (for debugging) or abortion of the offending process, and automatic dumping of the process image to a file. The default actions, if no options have been specified, are termination, logging and display. Any outstanding request can be cancelled at any time.

The HI logging service provides the facility to store error messages in chronological file, maintain a hardcopy log, and create a dynamic display of errors, ordered by time, priority, class, etc. The debugger is often invoked upon occurrence of a process error to examine the process' state for clues.

DETAILED DESCRIPTION OF THE INVENTION

Figure 11:
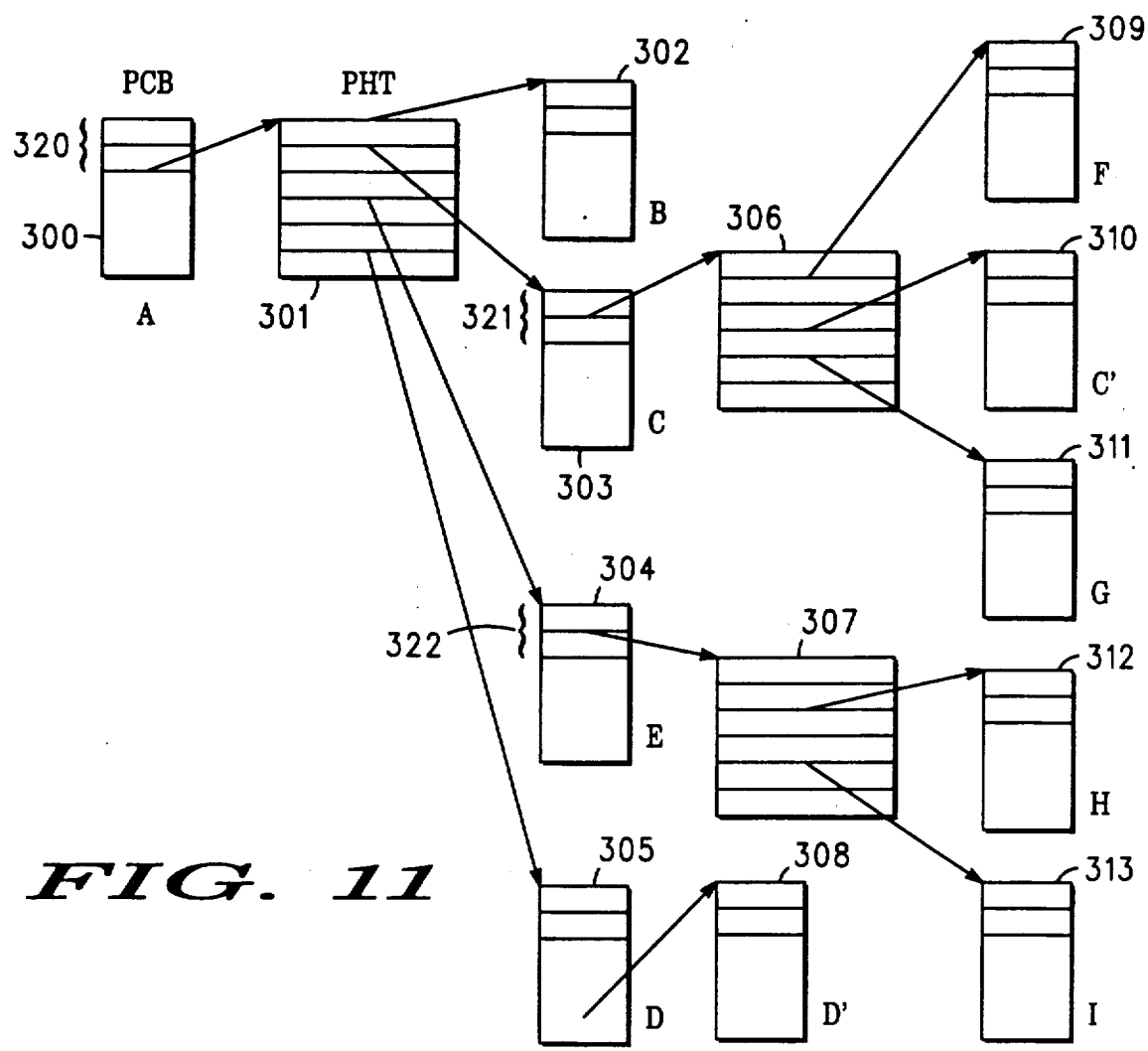
FIG. 11 illustrates the relationship between contexts and processes, in terms of process control blocks (PCB's) and process hash tables (PHT's).

FIG. 11 shows a conceptual representation illustrating the relationship between contexts and processes, in terms of context processes, process control blocks (PCB's), and process has tables (PHT's). FIG. 11 also illustrates the concept of nested context. For example, process A is a context process for the context comprising processes A-E. Process C is a context process for the context comprising processes C', F, and G. Process E is a context process for the context comprising processes H and I. And process D is a context process for the context comprising processes D and D'.

Figure 12:
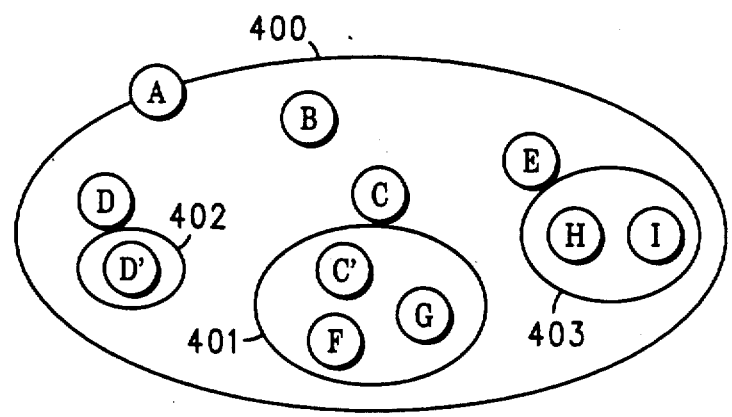
FIG. 12 shows a different conceptual representation of the contexts and processes illustrated in FIG. 11.

FIG. 12 shows a slightly different conceptual representation of the identical nested contexts illustrated in FIG. 11. As seen in FIG. 12, the context 401 comprising processes C, C', F, and G is contained within the context 400 comprising processes A-E. Also the context 403 comprising processes E, H, and I is contained within context 400. Likewise, the context 402 comprising processes D and D' is contained within context 400.

Referring again to FIG. 11, process A comprises a portion 300 of memory space, which includes a process control block (PCB) 320, which contains the starting member address of process A's process hash table (PHT) 301. PHT 301 is a table containing the starting memory addresses of each of the processes B-E contained within context 400 (FIG. 12), i.e., the context for which process A is the context process. Thus one location of the PHT 301 points to the starting memory address 302 of process B. Another location of PHT 301 points to the start of process C.

Process. C, being a context process for context 401 (FIG. 12), also contains a PCB 321, which points to the start of process C's PHT 306. PHT 306 contains the starting addresses of processes C', F, and G.

Another location of PHT 301 points to the start of process E. Process E is context process for context 403 (FIG. 12), so its PCB 322 contains the start of process E's PHT 307. PHT 307 contains the starting addresses of processes H and I.

Another location of PHT 301 points to the start of process D. Process D includes the starting address 308 of process D'.

OPERATION OF PREFERRED EMBODIMENT

With reference still to FIG. 11, the manner in which messages are communicated between processes of identical name contained within the same context will now be described with regard to the transmission mode NEXT (refer to the section above entitled "Interprocess Communication" for a further discussion of this transmission mode).

Regarding transmission mode NEXT, the usual procedure (i.e., when the sending process and receiving processes have different names) is to first search for the destination process by name within the sender's context. If the destination process isn't found there, then the search continues in the next higher context (i.e., the parent context), then in the parent's parent context, etc. The first process with the specified name in the first context level where at least one match is found will receive the message.

Where transmission mode NEXT is used to communicate between processes having the same name, a slightly different procedure governs. If the sending process is the only process with the specified name within its context, then it will also be the receiver of the message.

If there are several processes with the specified name in the sender's context, then the next one listed in the PHT of the context process will receive the message first. This process then retransmits the message, again using the transmission mode NEXT, and the message goes to the next process, if any, listed in the PHT of the context process. This procedure continues until all processes with the same name within the same context have received the message, and the message has wrapped around and been received by the sending process.

To illustrate, assume, for example, that process C' wants to send a message to process(es) C. The process hash table (PHT) 306 of the context process C is searched, locating the starting address 310 of process C', and the message is sent back to process C'. There are no other processes named C in context 401 (FIG. 12), so the message has wrapped around and is received by the sending process C'.

Assume now that process C is sending a message to process(es) C. The PHT 301 of the context process A is searched, locating the starting address of process C, and the message is sent to process C. Again, since C is the only process within context 400, the message wraps around to C.

Assume that process D wants to send a message to process(es) D. First the PHT 301 of the context process A is searched, locating the starting addressed 308 of process D', which is within the same context as process D, so the message is delivered to process D'.

Lastly, suppose that process D' wishes to send a message to process(es) D. The PHT 301 of the context process A is searched, locating the starting address 305 of process D, so the message is delivered to process D.

DESCRIPTION OF PROGRAM LISTINGS

Programs Listings A-F contain a "C" language implementation of the concepts relating to message transmission among processes as described hereinabove.

The data structures PCB (process control block) and PHT (process hash table) are declared in Program Listing F, lines 30-31 and defined in Program Listing C, lines 50-101. In Program Listing C, line 52 represents the pointer of a context process to its process hash table, and line 53 is a link between processes in the same context that have the same hash index (hash collisions).

In Program Listing A, lines 38-45 describe the creation of a process-context hierarchy, as shown in FIG. 11. Processes are created one at a time, their user-assigned name is hashed, and the resulting index is used to insert the process into the process hash table of its parent. Hash collisions within a context are linked in the order of their creation. Lines 66-73 describe the removal of a process from the process-context hierarchy, when that process terminates its execution.

In Program Listing B, lines 274-288 describe the "C" language implementation of the LOCAL transmission mode. The search starts in the PHT of the parent process (if the sender is a process) or in the sender's own PHT (if it is a context process). A copy of the message is delivered to each of the processes with the specified name in this context. The sender process is excluded from the search.

In Program Listing B, lines 274-391 describe the "C" language implementation of the ALL transmission mode. The search starts in the PHT of the parent process (if the sender is a process) or in the sender's own PHT (if it is a context process). A copy of the message is delivered to each of the processes with the specified name in the first parent context where at least one destination is found. The sender process is excluded from the search.

In Program Listing B, lines 473-503 describe the "C" language implementation of the NEXT transmission mode. The search starts in the PHT of the parent process, and the message is delivered to the first process with the specified name in the first parent context where at lest one destination is found. The search includes the sender process.

In Program Listing B, lines 476-491, in particular, describe the implementation of the logical ring, according to which a message is sent to each process with the same name in the same context. The "logical ring" procedure is used in transmission mode NEXT only, whenever the name of the destination process is the same as the name of the sender process. In this case the search starts with the next process with the same hash index in the sender's context, and it "wraps around" at the end of the linked list (i.e. continues with the first entry with the same hash index in the same PHT). If there is only one process (i.e., the sender process) with the given name in that context, then the sender process will receive the message.

In Program Listing B, lines 636-641 describe the "C" language implementation of the LEVEL transmission mode. The parent of a process is found using the pointer in the PCB (line 51 in Program Listing C).

It will be apparent to those skilled in the art that the herein disclosed invention may be modified in numerous ways and may assume many embodiments other than the preferred form specifically set out and described above. Accordingly, it is intended by the appended claims to cover all modifications of the invention which fall within the true spirit and scope of the invention.

PROGRAM LISTING A

```
10          MODULE NAME    : %%%
11          SUBSYSTEM NAME : kernel
12          DATE & TIME OF CREATION    :    %E%      %U%
13          DATE & TIME OF COMPILATION :    %D%      %T%
14          VERSION :      %R%.%L%
15          PROGRAMMER   : Andrew Kun
16          DESCRIPTION  : Process management module (p_create & exit)
17          PARAMETERS PASSED   : .
18          PARAMETERS RETURNED :
19    */
20
21    #include "local/cx.h"
22    #include "local/os/vers.h"
23    #include "local/os/kerntypes.h"
24
25
26
27
28    void cx_p_create (pcb)
```

```
29    register PCB *pcb;
30    {
31      extern short hash();
32      extern void insert_fifo();
33      extern void tonim_cxc();
34
35      register PCB *p;
36      long i;
37
38      i = hash(pcb->p_name);
39      if ((p = *(pcb->parent->pht+i)) !=NULL) {
40        while (p->next_hash != NULL)
41          p = p->next_hash;
42        p->next_hash = pcb;
43      }
44      else
45        *(pcb->parent->pht+i) = pcb;
46      if (!pcb->parent->parent)
47        tonim_cxc(pcb->p_name,TRUE);
48      if (pcb->k_code != (char)SUSPENDED)
49        insert_fifo(pcb);
50    }
51
52
53
54    void cx_exit (pcb)
55    register PCB *pcb;
56    {
55      extern short hash();
56      extern void tonim_cxc();
57      extern void extract_rtrq();
58
59      register PCB *p;
60      register long i;
61
62      if (pcb->k_code == (char)NOCODE)          /* still running        */
63        extract_rtrq(pcb);
64      if (!pcb->parent->parent)
65        tonim_cxc(pcb->p_name,FALSE);
66      i = hash(pcb->p_name);
67      if ((p = *(pcb->parent->pht+i)) == pcb)
68        *(pcb->parent->pht+i) = pcb->next_hash;
69      else {
70        while (p->next_hash != pcb)
71          p = p->next_hash;
72        p->next_hash = pcb->next_hash;
73      }
74      pcb->pid = 0L;
75    }
76
77
78
79    void pht_init()
80    {
81      extern long root[];
82      extern PCB *pht[];
```

```
83      register short i;
84
85      root[0] = 0;                          /* root's parent */
86      root[1] = (long) pht;                 /* root pht */
87      for (i=0; i<PHTSIZE; i++)
88        pht[i] = NULL;
89    }
90
91
92
93    void extract_rtrq(pcb)
94    register PCB *pcb;
95    {
96      extern PCB *rdynxt[], *rdylst[];
97      register PCB *p;
98
99      if ((p = rdynxt[pcb->c_pri]) == pcb) {
100       if (!(rdynxt[pcb->c_pri] = pcb->link))
101         rdylst[pcb->c_pri] = NULL;
102     }
103     else {
104       while (p&&(p->link!=pcb))
105         p = p->link;
106       if (!p)
107         if (!(p->link = pcb->link))
108           rdylst[pcb->c_pri] = p;
109     }
110   }
```

PROGRAM LISTING B

```
10    #         MODULE NAME      : %M%
11    #         SUBSYSTEM NAME   : kernel
12    #         DATE & TIME OF CREATION    :   %E%      %U%
13    #         DATE & TIME OF COMPILATION :   %D%      %T%
14    #         VERSION :         %R%.%L%
15    #         PROGRAMMER  :  Andrew Kun
16    #         DESCRIPTION : This file contains the implementation of the five
17    #                       inter-process communication support
18    #                       function: 'putfor'
19    #
20    #         PARAMETERS PASSED   : As per Kernel Interface Guide rev.6
21    #         PARAMETERS RETURNED : As per Kernel Interface Guide rev.6
22    # */
23    #
24    # #include "local/cx.h"
25    # #include "local/os/vers.h"
26    # #include "local/os/kerntypes.h"
27    #
28    # extern PCB *running;
29    # extern short hash();
30    # extern void tonim_xmit();
31    # extern PCB *makepcb();
32    # extern int strcmp();
33    # extern void queue_msg();
```

```
34   # extern void msg_err();
35   # extern MSG *my_allocmem();
36   # extern bool cx_freemem();
37   # extern char *memcpy();
38   # extern void insert_fifo();
39   # extern bool munlink();
40   #
41   # extern long root[];
42   # extern long starting;
43   # extern long this_cell;
44   #
45         set     MAXPRI,63
46   # MSG offsets
47         set     MNXT,0
48         set     MPRV,4
49         set     MFLG,8
50         set     MMOD,9
51         set     MPID,10
52         set     MOWN,14             # owner PCB.
53         set     MSIZ,18
54         set     MPRI,22
55         set     MMID,23
56   # EESP msg offsets
57         set     EMSG,24
58         set     ELEV,32
59         set     EPID,36
60   # PCB offsets
61         set     LNK,12              # link pointer
62         set     PID,44              # PCB pid.
63         set     PRI,48              # priority
64         set     KCD,49              # primitive code
65         set     FLG,51              # PCB flags
66         set     SP%,56              # current stack pointer
67         set     D0%,60              # register %d0
68         set     D1%,64              # register %d1
69         set     D2%,68              # register %d2
70         set     D3%,72              # register %d3
71         set     D4%,76              # register %d4
72         set     D5%,80              # register %d5
73         set     D6%,84              # register %d6
74         set     D7%,88              # register %d7
75         set     A0%,92              # register %a0
76         set     A1%,96              # register %a1
77         set     A2%,100             # register %a2
78         set     A3%,104             # register %a3
79         set     A4%,108             # register %a4
80         set     A5%,112             # register %a5
81         set     A6%,116             # register %a6
82         set     PC%,120             # register %pc
83         set     SR%,124             # register %sr
84         set     EXC,144             # execution time
85         set     ACT,148             # last activation
86   # Error levels
87         set     x_primitive,257     # bad kernel primitive
88         set     x_xmitmode,258      # bad transmission mode
89         set     x_pointer,259       # pointer to an odd address
```

```
 90          set     x_level,260         # bad interrupt level
 91          set     x_interrupt,261     # fatal interrupt
 92          set     x_fakemsg,262       # message isn't a real message
 93          set     x_stolenmsg,263     # message isn't owned by requester
 94          set     x_freedmsg,264      # message has been freed
 95          set     x_allocedmsg,265    # message was alloced, not gotten
 96          set     x_smallmsg,266      # message is too small for connect
 97
 98          text
 99          global  putfor
100          set     S%1,-16
101          set     T%1,-30
102          set     F%1,-34
103          set     M%1,0x3c00
104  putfor:
105  # bool putfor (mode, dest, msg)
106  # long mode;
107  # DESTINATION dest;
108  # register MSG *msg;
109  # {
110  #    extern short hash();
111  #    extern void tonim_xmit();
112  #    extern PCB *makepcb();
113  #    extern int strcmp();
114  #    extern void queue_msg();
115  #    extern void msg_err();
116  #    extern MSG *my_allocmem();
117  #    extern bool cx_freemem();
118  #    extern char *memcpy();
119  #    extern void insert_fifo();
120  #    extern bool munlink();
121  #
122  #    extern long root[];
123  #    extern long starting;
124  #    extern long this_cell;
125  #    register PCB *p, *q;
126  #    register MSG *m;
127  #    register PCB *r = running;
128  #    short i;
129  #    int found;
130  #    int *fromnim;
131  #
132          set     RUNNING,-4+S%1
133          set     I%,-6+S%1
134          set     FOUND%,-10+S%1
135          set     FROMNIM%,-14+S%1
136          set     ACCEPTED%,FOUND%+1
137
138          link    %fp,&-34
139          movm.l  &0x3c00,S%1(%fp)
140          tst.l   8(%fp)
141          blt.b   L%badmode
142          cmp.l   8(%fp),&4
143          ble.b   L%41                # if (!starting && (msg->owner !=r))
144  L%badmode:
```

```
145             mov.l   &x_xmitmode,-(%sp)
146             br      L%repfix
147  L%41:
148             mov.l   16(%fp),%a2
149             mov.l   running,RUNNING(%fp)
150             mov.l   &0,%d0                      #   fromnim = msg->flags & FROMNIM;
151             mov.b   MFLG(%a2),%d0
152             and.l   &8,%d0
153             mov.l   %d0,FROMNIM%(%fp)
154             mov.b   MFLG(%a2),%d0               #   accepted = msg->flags &
                                                    #   ACCEPTED;
155             and.b   &0x80,%d0
156             mov.b   %d0,ACCEPTED%(%fp)
157             and.b   &0x73,MFLG(%a2)             #msg->flags &= ~(FROMNIM|ACCEPTED|
                                                    #   LRING)
                                                    #   switch (mode) {
158             mov.l   8(%fp),%d0
159             cmp.l   %d0,&4
160             bhi     L%DEFAULT
161             add.w   %d0,%d0
162             mov.w   10(%pc,%d0.w),%d0
163             jmp     6(%pc,%d0.w)
164             swbeg   &5
165  L%149:
166             short   L%DIRECT-L%149
167             short   L%LOCAL-L%149
168             short   L%ALL-L%149
169             short   L%NEXT-L%149
170             short   L%LEVEL-L%149
171  #
172
173  #      case DIRECT:
174  #         if (msg->flags & ERROR) {
175  #         if (p = makepcb(dest.pid)) {
176  #            if ((msg->flags & CALLED) && (p->k_code==(char)CALL)) {
177  #               p->k_code &= SUSPENDED;
178  #               p->d0 = 0L;
179  #               insert_fifo(p);
180  #            }
181  #            msg_err(p->parent,msg);
182  #         }
183  #         else
184  #            msg_err(root,msg);
185  #         }
186  #         else if (*((char *)(&dest.pid)) != ((char)this_cell)) {
187  #         if (this_cell) {
188  #            munlink(msg,r);
189  #            tonim_xmit(msg,mode,dest);
190  #         }
191  #         else {
192  #            msg_err(r,msg);
193  #            if (msg->flags & CALLED)
194  #               return(FALSE);
195  #         }
196  #      }
197  #      else {
```

```
198  #          if (p = makepcb(dest.pid))
199  #            queue_msg(msg,p);
200  #          else if (!fromnim) {
201  #            msg_err(r->parent,msg);
202  #            if (msg->flags & CALLED)
203  #              return(FALSE);
204  #          }
205  #          else {
206  #            msg->flags |= ERROR;
207  #            munlink(msg,r);
208  #            tonim_xmit(msg,DIRECT,dest);
209  #          }
210  #        }
211  #        break;
212  L%DIRECT:
213           mov.l    12(%fp),(%sp)
214           jsr      makepcb
215           mov.l    %a0,%a3
216           btst     &4,MFLG(%a2)
217           beq.b    L%45
218           mov.l    %a3,%d0
219           beq.b    L%46
220           btst     &6,MFLG(%a2)
221           beq.b    L%47
222           cmp.b    KCD(%a3),&4
223           bne.b    L%47
224           and.b    &-128,KCD(%a3)
225           mov.l    %a3,(%sp)
226           jsr      insert_fifo
227  L%47:
228           mov.l    %a2,(%sp)
229           mov.l    (%a3),-(%sp)
230           jsr      msg_err
231           br       L%1
232  L%46:
233           mov.l    %a2,(%sp)
234           mov.l    &root,-(%sp)
235           jsr      msg_err
236           br       L%1
237  L%45:
238           mov.b    12(%fp),%d0       # if *((char *)(&dest.pid))!=((char)
                                         #                       this_cell)
239           cmp.b    %d0,this_cell+3
240           beq.b    L%50
241           tst.b    this_cell+3
242           beq      L%51
243           br       L%112x
244  L%50:
245           mov.l    %a3,%d0
246           beq.b    L%55
247           mov.l    %a3,(%sp)
248           br       L%3
249  L%55:
250           tst.l    FROMNIM%(%fp)
251           bne.b    L%57
```

```
252             mov.l   %a2,(%sp)
253             mov.l   RUNNING(%fp),%a0
254             mov.l   (%a0),-(%sp)
255     L%%14:
256             jsr     msg_err
257             add.l   &4,%sp
258             btst    &6,MFLG(%a2)
259             beq     L%RetTrue
260             br      L%DEFAULT
261     L%57:
262             bset    &4,MFLG(%a2)
263             mov.l   RUNNING(%fp),(%sp)
264             mov.l   %a2,-(%sp)
265             jsr     munlink
266             add.l   &4,%sp
267             mov.l   12(%fp),(%sp)
268             pea     0
269             mov.l   %a2,-(%sp)
270             br      L%%2
271     #
272
273     #       case LOCAL:
274     #         found = FALSE;
275     #         i = hash(dest.proc_name);
276     #         q = (r->pnt)? r: r->parent;
277     #         p = *(q->pnt+i);
278     #         for (; !found && p!=NULL; p=p->next_hash)
279     #         if (!strcmp(p->p_name,dest.proc_name)&&(p!=r)) {
280     #            found = TRUE;
281     #         }
282     #         for (; p =NULL; p=p->next_hash)
283     #         if (!strcmp(p->p_name,dest.proc_name)&&(p!=r)) {
284     #            m = my_allocmem(msg->size+sizeof(MSG));
285     #            memcpy(m,msg,msg->size+sizeof (MSG));
286     #            m->next = m->prev = NULL;
287     #            queue_msg(m,p);
288     #         }
289     #         if (q->parent && !found) {
290     #         msg_err(r,msg);
291     #         if (msg->flags & CALLED)
292     #            return(FALSE);
293     #         }
294     #         else if (!q->parent) {
295     #         if (!fromnim) {                          /* not from NIM */
296     #            if (found && this_cell) {
297     #              m = my_allocmem(msg->size+sizeof(MSG));
298     #              memcpy(m,msg,msg->size+sizeof (MSG));
299     #              m->next = m->prev = NULL;
300     #              m->flags |= ACCEPTED;
301     #              tonim_xmit(m,mode,dest);
302     #            }
303     #            else if (this_cell) {
304     #              munlink(msg,r);
305     #              tonim_xmit(msg,mode,dest);
306     #            }
```

```
307   #         else if (!found) {
308   #             msg_err(r,msg);
309   #             if (msg->flags & CALLED)
310   #                 return(FALSE);
311   #         }
312   #     }
313   #     else if (!accepted) {              /* from NIM, not
                                                  accepted */
314   #         if (found) {
315   #             m = my_allocmem(msg->size+sizeof(MSG));
316   #             memcpy(m,msg,msg->size+sizeof (MSG));
317   #             m->next = m->prev = NULL;
318   #             m->flags |= ACCEPTED | FROMNIM;
319   #             tonim_xmit(m,mode,dest);
320   #         }
321   #         else {
322   #             if (fromnim)
323   #                 msg->flags |= FROMNIM;
324   #             munlink(msg,r);
325   #             tonim_xmit(msg,mode,dest);
326   #         }
327   #     }
328   #     else if (!found)                   /* from NIM, accepted, not
                                                  found */
329   #         cx_freemem(msg+1);
330   #     }
331   #     break;
332   L%LOCAL:
333           clr.b    FOUND%(%fp)
334           mov.l    12(%fp),(%sp)
335           jsr      hash
336           mov.w    %d0,I%(%fp)
337           mov.l    RUNNING%(%fp),%a4
338           tst.l    4(%a4)
339           bne.b    L%62
340           mov.l    (%a4),%a4
341   L%62:
342           mov.w    I%(%fp),%d0
343           lsl.w    &2,%d0
344           mov.l    4(%a4),%a1
345           mov.l    0(%a1,%d0.w),%a3
346           br.b     L%65
347   L%64:
348           mov.l    12(%fp),%a0
349           lea      28(%a3),%a1
350   Z%1:
351           mov.b    (%a0)+,%d0
352           cmp.b    %d0,(%a1)+
353           bne.b    L%66
354           tst.b    %d0
355           bne.b    Z%1
356           cmp.l    %a3,RUNNING%(%fp)
357           beq.b    L%66
358           mov.l    &1,%d0
359           mov.b    %d0,FOUND%(%fp)
```

```
360              mov.l    %a3,(%sp)
361              mov.l    %a2,-(%sp)
362              jsr      queue_msg
363              add.l    &4,%sp
364              mov.l    8(%a3),%a3
365              br       L%64
366     L%66:
367              mov.l    8(%a3),%a3
368     L%65:
369              mov.l    %a3,%d0
370              bne.b    L%44
371              br       L%64
372     #
373
374     #      case ALL:
375     #        i = hash(dest.proc_name);
376     #        q = (r->pht)? r: r->parent;
377     #        for (found = FALSE; !found&&q; q = q->parent) {
378     #          p = *(q->pht+i);
379     #          for (; !found && p!=NULL; p=p->next_hash)
380     #            if (!strcmp(p->p_name,dest.proc_name)&&(p!=r)) {
381     #              found = TRUE;
382     #              queue_msg(msg,p);
383     #            }
384     #          for (; p!=NULL; p=p->next_hash)
385     #            if (!strcmp(p->p_name,dest.proc_name)&&(p!=r)) {
386     #              m = my_allocmem(msg->size+sizeof(MSG));
387     #              memcpy(m,msg,msg->size+sizeof (MSG));
388     #              m->next = m->prev = NULL;
389     #              queue_msg(m,p);
390     #            }
391     #        }
392     #        if (!q) {
393     #          if (found && this_cell) {
394     #            m = my_allocmem(msg->size+sizeof(MSG));
395     #            memcpy(m,msg,msg->size+sizeof (MSG));
396     #            m->next = m->prev = NULL;
397     #            m->flags |= ACCEPTED;
398     #            tonim_xmit(m,mode,dest);
399     #          }
400     #          else if (this_cell) {
401     #            munlink(msg,r);
402     #            tonim_xmit(msg,mode,dest);
403     #          }
404     #          else if (!found) {
405     #            msg_err(r,msg);
406     #            if (msg->flags & CALLED)
407     #              return(FALSE);
408     #          }
409     #        }
410     #        else if (!accepted) {
411     #          if (found) {
412     #            m = my_allocmem(msg->size+sizeof(MSG));
413     #            memcpy(m,msg,msg->size+sizeof (MSG));
414     #            m->next = m->prev = NULL;
415     #            m->flags |= ACCEPTED | FROMNIM;
```

```
416  #              tonim_xmit(m,mode,dest);
417  #           }
418  #           else {
419  #              if (fromnim)
420  #                  msg->flags |= FROMNIM;
421  #              munlink(msg,r);
422  #              tonim_xmit(msg,mode,dest);
423  #           }
424  #        }
425  #        else if (!found)
426  #           cx_freemem(msg+1);
427  #     }
428  #     break;
429  L%ALL:
430          mov.l    12(%fp),(%sp)
431          jsr      hash
432          mov.w    %d0,I%(%fp)
433          mov.l    RUNNING(%fp),%a4
434          tst.l    4(%a4)
435          bne.b    L%90
436          mov.l    (%a4),%a4
437  L%90:
438          clr.b    FOUND%(%fp)
439          br       L%93
440  L%%12:
441          mov.w    I%(%fp),%d0
442          lsl.w    &2,%d0
443          mov.l    4(%a4),%a1
444          mov.l    0(%a1,%d0.w),%a3
445          br.b     L%96
446  L%%5:
447          mov.l    12(%fp),%a0
448          lea      28(%a3),%a1
449  L%%2:
450          mov.b    (%a0)+,%d0
451          cmp.b    %d0,(%a1)+
452          bne.b    L%97
453          tst.b    %d0
454          bne.b    L%%2
455          cmp.l    %a3,RUNNING(%fp)
456          beq.b    L%97
457          mov.l    &1,%d0
458          mov.b    %d0,FOUND%(%fp)
459          mov.l    %a3,(%sp)
460          mov.l    %a2,-(%sp)
461          jsr      queue_msg
462          add.l    &4,%sp
463          mov.l    8(%a3),%a3
464          br       L%95
465  L%97:
466          mov.l    8(%a3),%a3
467  L%96:
468          mov.l    %a3,%d0
469          bne.b    L%%5
470          br       L%95
471  #
```

```
472
473  #       case NEXT:
474  #         i = hash(dest.proc_name);
475  #         found = FALSE;
476  #         if (!strcmp(dest.proc_name,r->p_name)) {
477  #         for (q=r,p=q->next_hash; !found ; p=p->next_hash) {
478  #           if (!p) {
479  #             if (!this_cell || r->parent->parent)
480  #               p = *(r->parent->pht+i);
481  #             else {
482  #               msg->flags |= LRING;
483  #               break;
484  #             }
485  #           }
486  #           if (!strcmp(p->p_name,dest.proc_name)) {
487  #             found = TRUE;
488  #             queue_msg(msg,p);
489  #             break;
490  #           }
491  #         }
492  #         q = r->parent->parent;
493  #         }
494  #         else
495  #         q = r->parent;
496  #         for (; !found&&q; q = q->parent) {
497  #         for (p = *(q->pht+i); p!=NULL; p=p->next_hash)
498  #           if (!strcmp(p->p_name,dest.proc_name)) {
499  #             found = TRUE;
500  #             queue_msg(msg,p);
501  #             break;
502  #           }
503  #         }
504  #         if (!q) {
505  #           m = my_allocmem(msg->size+sizeof(MSG));
506  #           memcpy(m,msg,msg->size+sizeof (MSG));
507  #           m->next = m->prev = NULL;
508  #           m->flags |= ACCEPTED | FROMNIM;
509  #           tonim_xmit(m,mode,dest);
510  #         }
511  #         else if (!found && this_cell) {
512  #           if (fromnim)
513  #             msg->flags |= FROMNIM;
514  #           munlink(msg,r);
515  #           tonim_xmit(msg,mode,dest);
516  #         }
517  #         else if (!found) {
518  #           msg_err(r,msg);
519  #           if (msg->flags & CALLED)
520  #             return(FALSE);
521  #         }
522  #         }
523  #         break;
524  #
525  L%NEXT:
526           mov.l    12(%fp),(%sp)
```

```
527             jsr      hash
528             mov.w    %d0,I%(%fp)
529             clr.b    FOUND%(%fp)
530             mov.l    RUNNING(%fp),%a0
531             lea      28(%a0),%a1
532             mov.l    12(%fp),%a0
533     Z%3:
534             mov.b    (%a0)+,%d0
535             cmp.b    %d0,(%a1)+
536             bne      L%117
537             tst.b    %d0
538             bne.b    Z%3
539             mov.l    RUNNING(%fp),%a4
540             mov.l    8(%a4),%a3
541             br.b     L%120
542     L%123:
543             mov.w    I%(%fp),%d0
544             lsl.w    &2,%d0
545             mov.l    RUNNING(%fp),%a1
546             mov.l    (%a1),%a1
547             mov.l    4(%a1),%a1
548             mov.l    0(%a1,%d0.w),%a3
549     L%121:
550             mov.l    12(%fp),%a0
551             lea      28(%a3),%a1
552     Z%4:
553             mov.b    (%a0)+,%d0
554             cmp.b    %d0,(%a1)+
555             bne      L%125
556             tst.b    %d0
557             bne.b    Z%4
558             mov.l    &1,%d0
559             mov.b    %d0,FOUND%(%fp)
560             mov.l    %a3,(%sp)
561             mov.l    %a2,-(%sp)
562             jsr      queue_msg
563             add.l    &4,%sp
564             br.b     L%119
565     L%125:
566             mov.l    8(%a3),%a3
567     L%120:
568             tst.b    FOUND%(%fp)
569             bne.b    L%119
570             mov.l    %a3,%d0
571             bne.b    L%121
572             tst.b    this_cell+3
573             beq.b    L%123
574             mov.l    RUNNING(%fp),%a0
575             mov.l    (%a0),%a0
576             tst.l    (%a0)
577             bne      L%123
578             or.b     &0x04,MFLG(%a2)
579             br.b     L%%6
580     L%119:
581             mov.l    RUNNING(%fp),%a0
```

```
582            mov.l    (%a0),%a0
583            br.b     L%%6
584   L%117:
585            mov.l    RUNNING(%fp),%a0
586   L%%6:
587            mov.l    (%a0),%a4
588            br.b     L%126
589   L%%8:
590            mov.w    I%(%fp),%d0
591            lsl.w    &2,%d0
592            mov.l    4(%a4),%a1
593            mov.l    0(%a1,%d0.w),%a3
594            br.b     L%132
595   L%%7:
596            mov.l    12(%fp),%a0
597            lea      28(%a3),%a1
598   Z%5:
599            mov.b    (%a0)+,%d0
600            cmp.b    %d0,(%a1)+
601            bne.b    L%133
602            tst.b    %d0
603            bne.b    Z%5
604            mov.l    &1,%d0
605            mov.b    %d0,FOUND%(%fp)
606            mov.l    %a3,(%sp)
607            mov.l    %a2,-(%sp)
608            jsr      queue_msg
609            add.l    &4,%sp
610            br.b     L%131
611   L%133:
612            mov.l    8(%a3),%a3
613   L%132:
614            mov.l    %a3,%d0
615            bne.b    L%%7
616   L%131:
617            mov.l    (%a4),%a4
618   L%126:
619            tst.b    FOUND%(%fp)
620            bne.b    L%128
621            mov.l    %a4,%d0
622            bne.b    L%%8
623   L%128:
624            mov.l    %a4,%d0
625            bne      L%RetTrue
626            tst.b    FOUND%(%fp)
627            beq.b    L%135
628            tst.l    FROMNIM%(%fp)
629            bne      L%fixnim
630   L%135:
631            tst.b    FOUND%(%fp)
632            bne      L%137
633            br       L%104
634   #
635
636   #    case LEVEL:
```

```
637     #           if (dest.proc_name[0]=='s')
638     #             queue_msg(msg,r);
639     #           else if (dest.proc_name[0]=='c')
640     #             if (r->parent)
641     #               queue_msg(msg,r->parent);
642     #             else
643     #               return(FALSE);
644     #           else {
645     #               reperr(X_XMITMODE);
646     #               return(FALSE);
647     #           }
648     #           break;
649     L%LEVEL:
650             mov.l    12(%fp),%a0
651             cmp.b    (%a0),&115
652             bne.b    L%142
653             mov.l    RUNNING(%fp),(%sp)
654             br.b     L%3
655     L%142:
656             cmp.b    (%a0),&99
657             bne.b    L%144
658             mov.l    RUNNING(%fp),%a0
659             tst.l    (%a0)
660             beq.b    L%145
661             mov.l    (%a0),(%sp)
662     L%3:
663             mov.l    %a2,-(%sp)
664             jsr      queue_msg
665     L%%1:
666             add.l    &4,%sp
667             mov.l    &1,%d0
668             br       L%26
669     L%144:
670             mov.l    &x_xmitmode,-(%sp)
671     L%repfix:
672             bsr      reperr
673     L%145:
674             mov.l    &0,%d0                          #       return(FALSE);
675     L%26:
676             movm.l   S%1(%fp),&0x3c00
677             unlk     %fp
678             rts
679     L%%10:
680             mov.l    12(%fp),%a0
681             lea      28(%a3),%a1
682     Z%6:
683             mov.b    (%a0)+,%d0
684             cmp.b    %d0,(%a1)+
685             bne.b    L%70
686             tst.b    %d0
687             bne.b    Z%6
688             cmp.l    %a3,RUNNING(%fp)
689             beq.b    L%70
690             mov.l    MSIZ(%a2),%d0
691             add.l    &24,%d0
692             mov.l    %d0,(%sp)
```

```
693            jsr      my_allocmem
694            mov.l    %a0,%a5
695            mov.l    (%sp),%d0
696            add.l    &3,%d0
697            lsr.l    &2,%d0
698            mov.l    %a2,%a1
699            br.b     Q%1
700   P%1:
701            swap     %d0
702   Q%1:
703            mov.l    (%a1)+,(%a0)+
704            dbra     %d0,Q%1
705            swap     %d0
706            dbra     %d0,P%1
707            sub.l    %a0,%a0
708            mov.l    %a0,MPRV(%a5)
709            mov.l    %a0,(%a5)
710            mov.l    %a3,(%sp)
711            mov.l    %a5,-(%sp)
712            jsr      queue_msg
713            add.l    &4,%sp
714   L%70:
715            mov.l    8(%a3),%a3
716   L%64:
717            mov.l    %a3,%d0
718            bne.b    L%%10
719            tst.l    (%a4)
720            beq.b    L%71
721            tst.b    FOUND%(%fp)
722            beq      L%51
723   L%71:
724            tst.l    (%a4)
725            bne      L%RetTrue
726            tst.l    FROMNIM%(%fp)
727            beq      L%%11
728            tst.b    ACCEPTED%(%fp)
729            bne.b    L%83
730            tst.b    FOUND%(%fp)
731            bne      L%fixnim
732            bset     &3,MFLG(%a2)      # if (fromnim) msg->flags |= FROMNIM;
733            mov.l    RUNNING(%fp),(%sp)
734            mov.l    %a2,-(%sp)
735            jsr      munlink
736            add.l    &4,%sp
737            mov.l    12(%fp),(%sp)
738            mov.l    8(%fp),-(%sp)
739            mov.l    %a2,-(%sp)
740            jsr      tonim_xmit        # 1
741            add.l    &8,%sp
742            mov.l    &1,%d0
743            br       L%26
744   L%111:
745   L%83:
746            tst.b    FOUND%(%fp)
747            bne      L%RetTrue
748            lea.l    24(%a2),%a0
```

```
749              mov.l    %a0,(%sp)
750              jsr      cx_freemem
751              br       L%RetTrue
752     L%93:
753              tst.b    FOUND%(%fp)
754              bne.b    L%92
755              mov.l    %a4,%d0
756              bne      L%%12
757     L%92:
758              mov.l    %a4,%d0
759              bne      L%RetTrue
760              tst.l    FROMNIM%(%fp)
761              bne.b    L%103
762     L%%11:
763              tst.b    FOUND%(%fp)
764              beq.b    L%76
765              tst.b    this_cell+3
766              bne.b    L%%9
767              br.b     L%78
768     L%104:
769     L%76:
770              tst.b    this_cell+3
771              bne      L%112x
772     L%137:
773     L%78:
774              tst.b    FOUND%(%fp)
775              bne      L%RetTrue
776     L%51:
777              mov.l    %a2,(%sp)
778              mov.l    RUNNING(%fp),-(%sp)
779              br       L%%14
780     L%103:
781              tst.b    ACCEPTED%(%fp)
782              bne      L%111
783              tst.b    FOUND%(%fp)
784              beq.b    L%112
785              br       L%fixnim
786     L%%9:
787              mov.l    MSIZ(%a2),%d0
788              add.l    &24,%d0
789              mov.l    %d0,(%sp)
790              jsr      my_allocmem
791              mov.l    %a0,%a5
792              mov.l    (%sp),%d0
793              add.l    &3,%d0
794              lsr.l    &2,%d0
795              mov.l    %a2,%a1
796              br.b     Q%2
797     P%2:
798              swap     %d0
799     Q%2:
800              mov.l    (%a1)+,(%a0)+
801              dbra     %d0,Q%2
802              swap     %d0
803              dbra     %d0,P%2
804              sub.l    %a0,%a0
```

```
805             mov.l    %a0,MPRV(%a5)
806             mov.l    %a0,(%a5)
807             bset     &7,MFLG(%a5)
808             mov.l    12(%fp),(%sp)
809             mov.l    8(%fp),-(%sp)
810             mov.l    %a5,-(%sp)
811             br.b     L%%2
812     L%112:
813             tst.l    FROMNIM%(%fp)    # if (fromnim) msg->flags |= FROMNIM;
814             beq.b    L%112x
815             bset     &3,MFLG(%a2)
816     L%112x:
817             mov.l    RUNNING(%fp),(%sp)
818             mov.l    %a2,-(%sp)
819             jsr      munlink
820             add.l    &4,%sp
821             mov.l    12(%fp),(%sp)
822             mov.l    8(%fp),-(%sp)
823             mov.l    %a2,-(%sp)
824     L%%2:
825             jsr      tonim_xmit       # 2
826             add.l    &8,%sp
827     L%RetTrue:
828             mov.l    &1,%d0
829             br       L%26
830     L%%15:
831             mov.l    12(%fp),%a0
832             lea      28(%a3),%a1
833     Z%7:
834             mov.b    (%a0)+,%d0
835             cmp.b    %d0,(%a1)+
836             bne.b    L%101
837             tst.b    %d0
838             bne.b    Z%7
839             cmp.l    %a3,RUNNING(%fp)
840             beq.b    L%101
841             mov.l    MSIZ(%a2),%d0
842             add.l    &24,%d0
843             mov.l    %d0,(%sp)
844             jsr      my_allocmem
845             mov.l    %a0,%a5
846             mov.l    (%sp),%d0
847             add.l    &3,%d0
848             lsr.l    &2,%d0
849             mov.l    %a2,%a1
850             br.b     Q%3
851     P%3:
852             swap     %d0
853     Q%3:
854             mov.l    (%a1)+,(%a0)+
855             dbra     %d0,Q%3
856             swap     %d0
857             dbra     %d0,P%3
858             sub.l    %a0,%a0
859             mov.l    %a0,MPRV(%a5)
```

```
860             mov.l   %a0,(%a5)
861             mov.l   %a3,(%sp)
862             mov.l   %a5,-(%sp)
863             jsr     queue_msg
864             add.l   &4,%sp
865     L%101:
866             mov.l   8(%a3),%a3
867     L%95:
868             mov.l   %a3,%d0
869             bne.b   L%%15
870             mov.l   (%a4),%a4
871             br      L%93
872
873     L%fixnim:
874             mov.l   MSIZ(%a2),%d0
875             add.l   &24,%d0
876             mov.l   %d0,(%sp)
877             jsr     my_allocmem
878             mov.l   %a0,%a5
879             mov.l   (%sp),%d0
880             add.l   &3,%d0
881             lsr.l   &2,%d0
882             mov.l   %a2,%a1
883             br.b    Q%fx
884     P%fx:
885             swap    %d0
886     Q%fx:
887             mov.l   (%a1)+,(%a0)+
888             dbra    %d0,Q%fx
889             swap    %d0
890             dbra    %d0,P%fx
891             sub.l   %a0,%a0
892             mov.l   %a0,MPRV(%a5)
893             mov.l   %a0,(%a5)
894             or.b    &0x88,MFLG(%a5)  # m->flags |= ACCEPTED | FROMNIM;
895             mov.l   12(%fp),(%sp)
896             mov.l   8(%fp),-(%sp)
897             mov.l   %a5,-(%sp)
898             jsr     tonim_xmit
899             add.l   &8,%sp
900             mov.l   &1,%d0
901             br      L%26
902
```

PROGRAM LISTING C

```
1   /*
2    *   File name:      kerntypes.h
3    *
4    *   Author:         Andrew Kun
5    *
6    *   Description:    This file contains global definitions of the Kernel
7    *                   constants and data structure types
8    *
9    */
10
11  #ifndef EVHI
```

```
12
13   #define      PROC            void
14
15   #define      SUSPENDED       0x80
16   #define      EESP            0x40
17
18   #define      INTMASK         0x0700
19
20   enum kcalls  {NOCODE,PUT,FORWARD,GET,CALL,REPLY,EXIT,CONNECT,DISCONNECT,
21                 ALLOCMEM,FREEMEM,P_CREATE,RELEASE,SUSPEND,RESTART,ANY_MSG} ;
22
23   enum sysers {NIMALLOC,NIMFREE,NIMMODE,NIMREQ} ;
24
25   /* bit positions of the flags */
26
27   #define      ACCEPTED        0x80
28   #define      CALLED          0x40
29   #define      REPLIED         0x20
30   #define      ERROR           0x10
31   #define      FROMNIM         0x08
32   #define      LRING           0x04
33
34   typedef struct msg {
35       struct msg *next, *prev;
36       unsigned char flags;
37       unsigned char mode;
38       long pid;
39       struct pcb *owner;
40       unsigned long size;
41       unsigned char priority;
42       unsigned char mid;
43   } MSG;
44
45
46   /*      Process Control Block: what is specific for each process        */
47
48   #define PHTSIZE 64
49
50   typedef struct pcb {
51       struct pcb *parent;         /* pointer to the parent process             */
52       struct pcb **pht;           /* ptr to hash table, if NULL: not ctx       */
53       struct pcb *next_hash;      /* ptr to next sibling (with same hash index)*/
54       struct pcb *link;           /* ptr to the ready-to-run-queue             */
55       MSG *m_first, *m_last;      /* pointers to enqueued (waiting) messages   */
56       MSG *mc;                    /* ptr to queue of messages being processed  */
57       char p_name[MAXNAM];        /* process instance name                     */
58       long pid;                   /* process instance id                       */
59       char c_pri;                 /* process priority                          */
60       char k_code;                /* process state: used by the scheduler      */
61       unsigned char mid;          /* message id. currently being Call-Replied  */
62       unsigned char flags;        /* t.b.d.                                    */
63       int *stack;                 /* stack start address (virtual)             */
64       long *c_stck;               /* current stack pointer                     */
65       long d0;                    /*      68000 registers                      */
66       long d1;
67       long d2;
68       long d3;
69       long d4;
70       long d5;
71       long d6;
72       long d7;
73       long a0;
74       long a1;
75       long a2;
```

```
 76         long a3;
 77         long a4;
 78         long a5;
 79         long a6;
 80         long pc;
 81         short sr;
 82         short crtcount;          /* # of child processes being precreated  */
 83         struct ptmdef *ptmptr;   /* template definition pointer            */
 84         struct crtrap *susptrap; /* susp'd precr'r parent trap, NULL if none
 85                                     -1, if not immediate parent trapped   */
 86         struct trtrap *termtrap; /* termination trap                       */
 87         long time_snap;
 88         long exec_time;          /* total process execution time           */
 89         long act_time;           /* process activation time                */
 90 #if PERFMON
 91         long time_snap;
 92         int gets;
 93         int puts;
 94         int calls;
 95         int forwards;
 96         int replies;
 97         int allocs;
 98         int frees;
 99         bool termd;
100 #endif
101 ) PCB;
102
103
104 #if PERFMON
105 enum EXMOD { TOTAL , HASHEDIN , DELHASH };
106 #endif
107
108
109
110 #define      EVLO         2
111 #define      EVHI         267
112
113 typedef struct ct {
114     PCB *pcb;
115     MSG *msg;
116 } CT;
117
118 /* Error types */
119
120 #define      X_PRIMITIVE    257    /* bad kernel primitive      */
121 #define      X_XMITMODE     258    /* bad transmission mode     */
122 #define      X_POINTER      259    /* pointer to an odd address */
123 #define      X_LEVEL        260    /* bad interrupt level       */
124 #define      X_INTERRUPT    261    /* fatal interrupt           */
125 #define      X_FAKEMSG      262    /* message isn't real        */
126 #define      X_STOLENMSG    263    /* message has been stolen   */
127 #define      X_FREEDMSG     264    /* message has been freed    */
128 #define      X_ALLOCEDMSG   265    /* message wasn't gotten     */
129 #define      X_SMALLMSG     266    /* message isn't EE          */
130
131 #endif
```

PROGRAM LISTING D

```
 10      MODULE NAME    :  eesr.c
 11      SUBSYSTEM NAME :  kernel
 12      DATE & TIME OF CREATION    :   XEX      12:53:27
 13      DATE & TIME OF COMPILATION :   85/03/25  16:32:37
```

```
            VERSION    :    1.7
            PROGRAMMER :    Andrew Kun
            DESCRIPTION: External event management module.
            PARAMETERS PASSED  : As per General Services Interface Guide rev.3
            PARAMETERS RETURNED: As per General Services Interface Guide rev.3
*/ include "local/cx.h"
include "local/os/vers.h"
#include "local/os/eesp.h"
#include "local/os/kerntypes.h"

extern CT conn_tab[];

bool cx_connect (level, msg)
int level;
MSG *msg;
{
  extern void event_switch();
  extern PCB *running;

if (conn_tab[level].pcb)
    return(FALSE);
  if (msg) {
    conn_tab[level].msg = msg-1;
    strcpy(msg,"event");
    ((EE *)msg)->event_level = level;
  }
  else
    conn_tab[level].msg = 0;
  conn_tab[level].pcb = running;
  if (level < 256)
    *((int *)(level*4)) = (int) event_switch;
  return(TRUE);
} bool cx_disconnect (level)
int level;
{
  if (conn_tab[level].pcb != running)
    return(FALSE);
  conn_tab[level].pcb = NULL;
  conn_tab[level].msg = NULL;
  return(TRUE);
} void cx_release ()
{
  extern PCB *running;

running->sr &= -INTMASK;
  running->flags &= -EESP;
}
```

```
69
70
71   bool cx_suspend (pid)
72   long pid;
73   {
74    `extern PCB *makepcb();
75
76     register PCB *p;
77
78     if (!(p = makepcb(pid)) || (p->k_code & SUSPENDED))
79        return(FALSE);
80     p->k_code |= SUSPENDED;
81     return(TRUE);
82   }
83
84
85   bool cx_restart (pid)
86   long pid;
87   {
88     extern PCB *makepcb();
89     extern void insert_fifo();
90
91     register PCB *p;
92
93     if (!(p = makepcb(pid)) || !(p->k_code & SUSPENDED))
94        return(FALSE);
95     p->k_code &= ~SUSPENDED;
96     if (p->k_code == (char)NOCODE)
97        insert_fifo(p);
98     return(TRUE);
99   }
100
101
102  void event_init()
103  {
104     extern void event_switch();
105
106     int i;
107     long *p;
108
109     for (i=0/*,p=(long *)(EVLO*4)*/; i<=EVHI; i++) {
110  /*     *p++ = (long) event_switch; */
111        conn_tab[i].pcb = NULL;
112        conn_tab[i].msg = NULL;
113     }
114  }
```

PROGRAM LISTING E

```
1          file    "kentry.s"
2
3          set     MAXPRI,63
4   # MSG offsets
5          set     MNXT,0
6          set     MPRV,4
```

```
 7          set    MFLG,8
 8          set    MMOD,9
 9          set    MPID,10                     # owner PCB.
10          set    MOWN,14
11          set    MSIZ,18
12          set    MPRI,22
13          set    MMID,23
14  # EESP msg offsets
15          set    EMSG,24
16          set    ELEV,32
17          set    EPID,36
18  # PCB offsets
19          set    LNK,12                      # link pointer
20          set    PID,44                      # PCB pid.
21          set    PRI,48                      # priority
22          set    KCD,49                      # primitive code
23          set    FLG,51                      # PCB flags
24          set    SP%,56                      # current stack pointer
25          set    D0%,60                      # register %d0
26          set    D1%,64                      # register %d1
27          set    D2%,68                      # register %d2
28          set    D3%,72                      # register %d3
29          set    D4%,76                      # register %d4
30          set    D5%,80                      # register %d5
31          set    D6%,84                      # register %d6
32          set    D7%,88                      # register %d7
33          set    A0%,92                      # register %a0
34          set    A1%,96                      # register %a1
35          set    A2%,100                     # register %a2
36          set    A3%,104                     # register %a3
37          set    A4%,108                     # register %a4
38          set    A5%,112                     # register %a5
39          set    A6%,116                     # register %a6
40          set    PC%,120                     # register %pc
41          set    SR%,124                     # register %sr
42          set    EXC,144                     # execution time
43          set    ACT,148                     # last activation
44  # Error levels
45          set    x_primitive,257             # bad kernel primitive
46          set    x_xmitmode,258              # bad transmission mode
47          set    x_pointer,259               # pointer to an odd address
48          set    x_level,260                 # bad interrupt level
49          set    x_interrupt,261             # fatal interrupt
50          set    x_fakemsg,262               # message isn't a real message
51          set    x_stolenmsg,263             # message isn't owned by requester
52          set    x_freedmsg,264              # message has been freed
53          set    x_allocdmsg,265             # message was alloced, not gotten
54          set    x_smallmsg,266              # message is too small for connect
55  # EESP levels
56          set    EVLO,2
57          set    EVHI,267
58
59          text
60
61          global cx_initialize
```

```
 62         global   k_entry
 63         global   tick
 64         global   event_switch
 65
 66   cx_initialize:
 67         mov.w    &0x2700,%sr
 68         mov.l    &0x1000,%sp
 69         jsr      start_up                    # start_up();
 70         mov.w    &0,-(%sp)                   # schedule();
 71         jmp      L%schedule
 72
 73   k_entry:
 74         mov.w    &0x2700,%sr
 75         clr.w    suspended
 76         movm.l   &0xc0c0,-(%sp)              # %d0-%d1/%a0-%a1
 77         sub.w    &1,%d0                      # switch (running->d0) {
 78         cmp.w    %d0,&14
 79         bhi      L%primerr
 80         add.w    %d0,%d0
 81         mov.w    10(%pc,%d0.w),%d0
 82         jmp      6(%pc,%d0.w)
 83         swbeg    &15
 84   L%63:
 85         short    L%PUT-L%63
 86         short    L%FORWARD-L%63
 87         short    L%GET-L%63
 88         short    L%CALL-L%63
 89         short    L%REPLY-L%63
 90         short    L%EXIT-L%63
 91         short    L%CONNECT-L%63
 92         short    L%DISCONNECT-L%63
 93         short    L%ALLOCMEM-L%63
 94         short    L%FREEMEM-L%63
 95         short    L%P_CREATE-L%63
 96         short    L%RELEASE-L%63
 97         short    L%SUSPEND-L%63
 98         short    L%RESTART-L%63
 99         short    L%ANY_MSG-L%63
100
101   L%PUT:
102         mov.l    %a1,%d0                     # if (!msg ||
103         beq      L%fakemsg
104         sub.l    heapstart,%d0               # msg < heapstart ||
105         blt      L%fakemsg
106         sub.l    &24,%d0                     #   ((msg - 1) - heapstart) &
107         and.l    h_unitm1,%d0                #   (h_unit - 1))
108         bne      L%fakemsg                   #   then reperr (X_FAKEMSG);
109         mov.l    (MOWN - 24)(%a1),%d0        # if ((msg - 1)->owner
110         cmp.l    %d0,running                 #   != running)
111         bne      L%stolenmsg                 #   then reperr (X_STOLENMSG);
112         movm.l   &0x40c0,-(%sp)
113         bsr.w    cx_put                      # cx_put(running->d1,a0,a1);
114         add.l    &12,%sp
115         br       L%49                        # break;
116
```

```
117   L%FORWARD:
118           mov.l     %a1,%d0                    # if (!msg ||
119           beq       L%fakemsg
120           sub.l     heapstart,%d0              # msg < heapstart ||
121           blt       L%fakemsg
122           sub.l     &24,%d0                    #   ((msg - 1) - heapstart) &
123           and.l     h_unitm1,%d0               #   (h_unit - 1))
124           bne       L%fakemsg                  #   then reperr (X_FAKEMSG);
125           mov.l     (MOWN - 24)(%a1),%d0       # if ((msg - 1)->owner
126           cmp.l     %d0,running                #   != running)
127           bne       L%stolenmsg                #   then reperr (X_STOLENMSG);
128           mov.l     (MPID - 24)(%a1),%d0       # if (!(msg - 1)->pid)
129           beq       L%allocedmsg               #   then reperr (X_ALLOCEDMSG);
130           movm.l    &0x40c0,-(%sp)
131           bsr.w     cx_forward                 # cx_forward(running->d1,a0,a1);
132           add.l     &12,%sp
133           br        L%49                       # break;
134
135   L%GET:
136           mov.l     %a0,%d0
137           btst      &0,%d0
138           bne       L%ptrerr
139           mov.l     %a1,%d0
140           btst      &0,%d0
141           bne       L%ptrerr
142           movm.l    &0x40c0,-(%sp)
143           bsr.w     cx_get                     # cx_get(running->d1,a0,a1);
144           add.l     &12,%sp
145           br        L%49                       # break;
146
147   L%CALL:
148           mov.l     %a1,%d0                    # if (!msg ||
149           beq       L%fakemsg
150           sub.l     heapstart,%d0              # msg < heapstart ||
151           blt       L%fakemsg
152           sub.l     &24,%d0                    #   ((msg - 1) - heapstart) &
153           and.l     h_unitm1,%d0               #   (h_unit - 1))
154           bne       L%fakemsg                  #   then reperr (X_FAKEMSG);
155           mov.l     (MOWN - 24)(%a1),%d0       # if ((msg - 1)->owner
156           cmp.l     %d0,running                #   != running)
157           bne       L%stolenmsg                #   then reperr (X_STOLENMSG);
158           mov.l     %a2,%d0
159           btst      &0,%d0
160           bne       L%ptrerr
161           mov.l     %a3,%d0
162           btst      &0,%d0
163           bne       L%ptrerr
164           movm.l    &0x40f0,-(%sp)
165           bsr.w     cx_call                    # cx_call(running->d1,a0,a1,a2,a3);
166           add.l     &20,%sp
167           br        L%49                       # break;
168
169   L%REPLY:
170           mov.l     %a0,%d0                    # if (!msg ||
171           beq       L%fakemsg
172           sub.l     heapstart,%d0              # msg < heapstart ||
```

```
173             blt     L%fakemsg           #   ((msg - 1) - heapstart) &
174             sub.l   &24,%d0             #   (h_unit - 1))
175             and.l   h_unitm1,%d0        #   then reperr (X_FAKEMSG);
176             bne     L%fakemsg
177             mov.l   (MOWN - 24)(%a0),%d0 # if ((msg - 1)->owner
178             cmp.l   %d0,running         #    != running)
179             bne     L%stolenmsg         #   then reperr (X_STOLENMSG);
180             mov.l   %a1,%d0             # if (!msg ||
181             beq     L%fakemsg
182             sub.l   heapstart,%d0       # msg < heapstart ||
183             blt     L%fakemsg
184             sub.l   &24,%d0             #   ((msg - 1) - heapstart) &
185             and.l   h_unitm1,%d0        #   (h_unit - 1))
186             bne     L%fakemsg           #   then reperr (X_FAKEMSG);
187             mov.l   (MOWN - 24)(%a1),%d0 # if ((msg - 1)->owner
188             cmp.l   %d0,running         #    != running)
189             bne     L%stolenmsg         #   then reperr (X_STOLENMSG);
190             mov.l   (MPID - 24)(%a0),%d0 # if (!(msg - 1)->pid)
191             beq     L%allocedmsg        #   then reperr (X_ALLOCEDMSG);
192             movm.l  &0x00c0,-(%sp)
193             bsr.w   cx_reply            # cx_reply(running->a0,a1);
194             add.l   &8,%sp
195             br      L%49                # break;
196
197     L%EXIT:
198             mov.l   %a0,%d0             # if (!msg ||
199             beq     L%fakemsg
200             sub.l   heapstart,%d0       # msg < heapstart ||
201             blt     L%fakemsg
202             sub.l   &24,%d0             #   ((msg - 1) - heapstart) &
203             and.l   h_unitm1,%d0        #   (h_unit - 1))
204             bne     L%fakemsg           #   then reperr (X_FAKEMSG);
205             mov.l   (MOWN - 24)(%a0),%d0 # if ((msg - 1)->owner
206             cmp.l   %d0,running         #    != running)
207             bne     L%stolenmsg         #   then reperr (X_STOLENMSG);
208             mov.l   %a0,-(%sp)
209             bsr.w   cx_exit             # cx_exit(running->a0);
210             add.l   &4,%sp
211             br      L%49                # break;
212
213     L%CONNECT:
214             mov.l   %a0,%d0             # if (msg &&
215             beq     L%00
216             sub.l   heapstart,%d0       # (msg < heapstart ||
217             blt     L%fakemsg
218             sub.l   &24,%d0             #   ((msg - 1) - heapstart) &
219             and.l   h_unitm1,%d0        #   (h_unit - 1)))
220             bne     L%fakemsg           #   then reperr (X_FAKEMSG);
221             mov.l   (MSIZ - 24)(%a0),%d0 # if ((msg - 1)->size < sizeof (EE))
222             cmp.l   %d0,&16
223             blt     L%smallmsg          #   then reperr (X_SMALLMSG);
224             mov.l   (MOWN - 24)(%a0),%d0 # if ((msg - 1)->owner != running
225             cmp.l   %d0,running
226             bne     L%stolenmsg         #   then reperr (X_STOLENMSG);
227     L%00:
```

```
228             cmp.l    %d1,&EVLO
229             blt      L%lvlerr
230             cmp.l    %d1,&EVHI
231             bgt      L%lvlerr
232             movm.l   &0x4080,-(%sp)
233             bsr.w    cx_connect             # cx_connect(running->d1,a0);
234             add.l    &8,%sp
235             br       L%49                   # break;
236
237   L%DISCONNECT:
238             cmp.l    %d1,&EVLO
239             blt      L%lvlerr
240             cmp.l    %d1,&EVHI
241             bgt      L%lvlerr
242             mov.l    %d1,-(%sp)
243             bsr.w    cx_disconnect          # cx_disconnect(running->d1);
244             add.l    &4,%sp
245             br       L%49                   # break;
246
247   L%ALLOCMEM:
248             mov.l    %d1,-(%sp)
249             bsr.w    cx_allocmem            # cx_allocmem(running->d1);
250             add.l    &4,%sp
251             br       L%49                   # break;
252
253   L%FREEMEM:
254             mov.l    %a0,%d0                # if (!msg ||
255             beq      L%fakemsg
256             sub.l    heapstart,%d0          # msg < heapstart ||
257             blt      L%fakemsg
258             sub.l    &24,%d0                #   ((msg - 1) - heapstart) &
259             and.l    h_unitm1,%d0           #    (h_unit - 1))
260             bne      L%fakemsg              #   then reperr (X_FAKEMSG);
261             mov.l    (MOWN - 24)(%a0),%d0   # if ((msg - 1)->owner
262             cmp.l    %d0,running            #    != running)
263             bne      L%stolenmsg            #   then reperr (X_STOLENMSG);
264             mov.l    %a0,-(%sp)
265             bsr.w    cx_freemem             # cx_freemem(running->a0);
266             add.l    &4,%sp
267             br       L%49                   # break;
268
269   L%P_CREATE:
270             mov.l    %a0,%d0                # if (!msg ||
271             beq      L%fakemsg
272             sub.l    heapstart,%d0          # msg < heapstart ||
273             blt      L%fakemsg
274             sub.l    &24,%d0                #   ((msg - 1) - heapstart) &
275             and.l    h_unitm1,%d0           #    (h_unit - 1))
276             bne      L%fakemsg              #   then reperr (X_FAKEMSG);
277             mov.l    (MOWN - 24)(%a0),%d0   # if ((msg - 1)->owner
278             cmp.l    %d0,running            #    != running)
279             bne      L%stolenmsg            #   then reperr (X_STOLENMSG);
280             mov.l    %a0,-(%sp)
281             bsr.w    cx_p_create            # cx_p_create(running->a0);
282             add.l    &4,%sp
283             br.b     L%49                   # break;
```

```
284
285    L%RELEASE:
286            and.w    &-1793,16(%sp)      # saved_sr &= ~INTMASK
287            bsr.w    cx_release          # cx_release();
288            br.b     L%49                # break;
289
290    L%SUSPEND:
291            mov.l    %d1,-(%sp)
292            bsr.w    cx_suspend          # cx_suspend(running->d1);
293            add.l    &4,%sp
294            br.b     L%49                # break;
295
296    L%RESTART:
297            mov.l    %d1,-(%sp)
298            jsr      cx_restart          # cx_restart(running->d1);
299            add.l    &4,%sp
300            br.b     L%49                # break;
301
302    L%ANY_MSG:
303            mov.l    %d1,-(%sp)
304            jsr      cx_any_msg          # cx_any_msg(running->d1);
305            add.l    &4,%sp
306            br.b     L%49
307
308    L%smallmsg:
309            mov.l    &x_smallmsg,-(%sp)
310            br.b     L%repfix
311
312    L%fakemsg:
313            mov.l    &x_fakemsg,-(%sp)
314            br.b     L%repfix
315
316    L%stolenmsg:
317            mov.l    &x_stolenmsg,-(%sp)
318            br.b     L%repfix
319
320    L%allocedmsg:
321            mov.l    &x_allocedmsg,-(%sp)
322            br.b     L%repfix
323
324    L%primerr:
325            mov.l    &x_primitive,-(%sp)
326            br.b     L%repfix
327
328    L%ptrerr:
329            mov.l    &x_pointer,-(%sp)
330            br.b     L%repfix
331
332    L%lvlerr:
333            mov.l    &x_level,-(%sp)
334    L%repfix:
335            bsr      reperr
336            add.l    &4,%sp
337            br.b     schedule
338
```

```
339  L%49:
340         mov.l   %d0,(%sp)              # schedule();
341
342  schedule:
343  #                                      # extern PCB *running;
344  #                                      # extern short suspended;
345         mov.l   running,%a1            # if (running->flags & EESP) {
346         btst    &6,FLG(%a1)
347         beq.b   L%27
348         tst.w   suspended              # if (!suspended)
349         beq     L%82                   #   rte();
350  #                                      # else {
351         mov.l   &0,-(%sp)
352         mov.l   &0,-(%sp)
353         bsr     save_state             # save_state();
354         and.b   &0xbf,FLG(%a1)         # running->flags &= -EESP;
355         and.w   &-1793,SR%(%a1)        # running->sr &= -INTMASK;
356  #                                      # for (;;) {
357  L%schedule:
358  #                                      # label:
359         bsr     get_hipri              # if (get_hipri()>=0)
360         tst.w   %d0
361  #                                      # select();
362         bge.b   L%81
363  #                                      # else {
364  #      add.l   &1,processor_idle_ctr  # processor_idle_ctr++;
365         clr.l   running                # running = 0;
366         stop    &0x2000                # wait();
367         mov.w   &0x2700,%sr
368         br.b    L%schedule
369
370  L%27:
371         tst.w   suspended              # else if (suspended) {
372         beq.b   L%45
373         mov.l   &0,-(%sp)
374         mov.l   &0,-(%sp)
375         bsr     save_state             # save_state();
376         br.b    L%schedule             # goto label;
377
378  L%45:
379         bsr.b   get_hipri              # else if (get_hipri() >
                                          #   running->c_pri
380         tst.w   %d0
381         blt.b   L%52
382         mov.l   running,%a0
383         cmp.b   %d0,PRI(%a0)
384         blt.b   L%52
385         mov.l   %d0,-(%sp)             # save i (new pri)
386         mov.l   %a1,-(%sp)             # save new_PCB
387         mov.l   %a0,%a1                # so that PCB is theres.
388         bsr     save_state             # save_state();
389         mov.l   %a1,-(%sp)             # insert_fifo(running);
390         bsr.w   insert_fifo
391         add.l   &4,%sp
392         mov.l   %a3,%a1                # new PCB
```

```
393             mov.w   &4,%d0                  # priority.
394     # select()
395     L%81:
396             lsl.w   &2,%d0                  # running = extract_fifo(&rtrq[i]);
397             lea.l   rdynxt,%a0              # if (!(rtrq[i].next=rtrq[i].next-
                                                  >link
398             mov.l   LNK(%a1),0(%a0,%d0.w)
399             bne.b   L%83
400             lea.l   rdylst,%a0
401             clr.l   0(%a0,%d0.w)            # rtrq[i].last = 0L;
402     L%83:
403             mov.l   %a1,running
404     #       add.l   &1,process_switch_ctr   # process_switch_ctr++;
405
406             mov.l   SP%(%a1),%a0            # restore_state();
407             mov.l   %a0,%usp
408             mov.l   PC%(%a1),-(%sp)         # rest. %pc
409             mov.w   SR%(%a1),-(%sp)         # rest. %sr
410             movm.l  D0%(%a1),&0x7fff        # d0-d7 + a0-a6
411             rte
412     #                                       # }
413     #                                       # else
414     #                                       # rte()
415     L%82:
416             movm.l  (%sp)+,&0x0303                  # %d0-%d1/%a0-%a1
417             rte
418     #                                       # }
419
420
421     # Finds highest priority process.
422     # returns a0 = rdynxt[i], a1 = PCB = (rdynxt[i]), d0 = -1 or priority.
423     # note - int's s.b. off.
424
425             set     t1,(MAXPRI+2)*4
426
427     get_hipri:
428             mov.w   &MAXPRI+1,%d0
429             lea.l   rdynxt+t1,%a0
430     L%74:
431             tst.l   -(%a0)                  # search priorities.
432             dbne    %d0,L%74
433             beq.b   L%72                    # rts
434     L%73:
435             mov.l   (%a0),%a1               # pcb
436             tst.b   KCD(%a1)                # k_code & suspended
437             bne.b   L%71
438     L%72:
439             rts
440     L%71:
441             mov.l   LNK(%a1),(%a0)          # try next.
442             bne.b   L%73
443             lea.l   rdylst,%a1
444             lsl.w   &2,%d0
445             clr.l   0(%a1,%d0.w)
446             lsr.w   &2,%d0
447             sub.w   &1,%d0
```

```
448             bra.b     L%74
449
450     # %a1 = PCB
451     # save_state(tmp1.l, tmp2.l, %d0, %d1, %a0, %a1, %sr, %pc)
452     # on exit a2=pc, a3=tmp1, a4=tmp2
453
454     save_state:
455             movm.l    12(%sp),&0x0103         # a0, d1, d0              48(12/ 0)
456             movm.l    &0x7fff,D0%(%a1)        # a0-a6,d7-d0             132( 3/30)
457             movm.l    (%sp)+,&0x1c00          # a2=pc,a3=tmp1,a4=tmp2
458             add.l     &12,%sp                 #                         14( 3/ 0)
459             mov.l     (%sp)+,A1%(%a1)         #                         12( 3/ 0)
460             mov.w     (%sp)+,SR%(%a1)         #                          8( 2/ 0)
461             mov.l     (%sp)+,PC%(%a1)         #                         12( 3/ 0)
462             mov       %usp,%a0                #                          6( 1/ 0)
463             mov.l     %a0,SP%(%a1)            #                         16( 2/ 2)
464             jmp       (%a2)                   # go home                  8( 2/ 0)
465                                               #                        ----------
466     #                                                                  280(37/32)
467
468     #                                         # void event_switch(offs)
469     #                                         # short offs;
470     #                                         # {
471     event_switch:
472     #                                         # extern CT conn_tab[];
473     #                                         # register PCB *p;
474     #                                         # register MSG *m;
475     #                                         # register int offset;
476     #                                         # save_scratch();
477             and.b     &0x7f,0xf19f11          # disable int's
478             movm.l    &0xc0c0,-(%sp)          # %d0-%d1/%a0-%a1
479             mov.w     %sr,%d0
480             mov.w     &0x2700,%sr
481             or.b      &0x80,0xf19f11          # enable int's
482             mov.l     %a2,-(%sp)
483             mov.w     26(%sp),%d1             # offset = offs;
484             lsl.w     &1,%d1                  # if(p = conn_tab[offset].pcb) {
485             mov.l     &conn_tab,%a1
486             tst.l     0(%a1,%d1.w)
487             beq       L%badintrpt
488             mov.l     0(%a1,%d1.w),%a2
489             and.w     &-1793,SR%(%a2)         # p->sr &= -INTMASK;
490             and.w     &1792,%d0
491             or.w      %d0,SR%(%a2)            # p->sr |= status_reg & INTMASK;
492             bset      &6,FLG(%a2)             # p->flags |= EESP;
493             mov.l     4(%a1,%d1.w),%a1        # m = conn_tab[offset].msg;
494             tst.l     running                 # if (running) {
495             beq       L%130
496             mov.l     running,%a0             # ((EE *)(m+1))->interrupted_pid =
                                                 #                      running->pid
497             mov.l     PID(%a0),EPID(%a1)
498             cmp.l     %a2,%a0                 # if (p!=running) {
499             beq.b     L%131
500             mov.l     (%sp)+,%d0
501             movm.l    &0x0060,-(%sp)          # save_state(running);
502             mov.l     %d0,%a2
```

```
503         mov.l    %a0,%a1             # copy p -> new savestate fmt.
504         bsr.w    save_state
505         mov.l    %a1,-(%sp)          # if (running->flags & EESP)
506         btst     &6,FLG(%a1)
507         beq.b    L%133
508         bsr.w    push_rtrq           # push_rtrq(running);
509         br.b     L%135               # else
510   L%133:
511         bsr.w    insert_fifo         # insert_fifo(running);
512   L%135:
513         add.l    &4,%sp
514         cmp.b    KCD(%a4),&3         # if (p->k_code == (char) GET)
515         bne.b    L%137
516         movm.l   &0x0018,-(%sp)      # deliver_msg(m,p);
517         bsr.w    deliver_msg
518         br.b     L%139
519   L%137:
520         tst.b    KCD(%a4)            # else if (p->k_code != (char) NOCODE)
521         bne.b    L%badintrpt
522   #                                  # else
523   L%140:
524         mov.l    %a4,-(%sp)          # extract_rtrq(p);
525         bsr.w    extract_rtrq
526         mov.l    %a3,-(%sp)          # insert_msg(m,p);
527         bsr.w    insert_msg
528   L%139:
529         add.l    &8,%sp
530         mov.l    %a4,%a1             # running = p;
531         br       L%83                # select();
532   #                                  # }
533   #                                  # else {
534   L%131:
535         or.w     %d0,20(%sp)         # change_saved_sr();
536         movm.l   &0x0060,-(%sp)      # insert_msg(m,p);
537         bsr.w    insert_msg
538         add.l    &8,%sp
539         mov.l    (%sp)+,%a2                      # rest_scratch();
540         movm.l   (%sp)+,&0x0303                  # %d0-%d1/%a0-%a1
541         rte
542   L%145:
543   L%130:
544         clr.l    EPID(%a1)           #((EE *)(m+1))->interrupted_pid= NULL;
545         cmp.b    KCD(%a2),&3         # if (p->k_code == (char) GET) {
546         bne.b    L%badintrpt
547         mov.l    %a2,running         # running = p;
548         movm.l   &0x0060,-(%sp)      # deliver_msg(m,p);
549         bsr.w    deliver_msg
550         add.l    &36,%sp             #unstack(fct_stack+trap_stack+ saved_reg
551         mov.l    running,%a1
552         br       L%83                # select();
553
554   L%badintrpt:
555         mov.l    &x_interrupt,-(%sp)
```

```
556         bsr     reperr
557         add.l   &12,%sp
558         br      L%schedule
559
560 tick:
561         rte
```

PROGRAM LISTING F

```
 9          MODULE NAME    : glob.c
10          SUBSYSTEM NAME : kernel
11          DATE & TIME OF CREATION    :   %E%      12:54:00
12          DATE & TIME OF COMPILATION : 85/03/25   16:32:40
13          VERSION  :   1.8
14          PROGRAMMER :  Andrew Kun
15          DESCRIPTION : This file contains the definition of the global
16                        variables of the Kernel.
17
18          PARAMETERS PASSED   :
19          PARAMETERS RETURNED :
20 */
21
22 #include "local/cx.h"
23 #include "local/os/vers.h"
24 #include "local/os/eesp.h"
25 #include "local/os/kerntypes.h"
26
27 long sys_time = 0;          /* current time from init           */
28 long sys_timeslice = 4;     /* timeslice allocated for a process */
29 long this_cell;             /* hardware address of the cell     */
30 long root[2];               /* dummy root context on cell       */
31 PCB *pht[PHTSIZE];          /* cell process hash table          */
32 PCB *rdynxt[MAXPRI+2];      /* ready-to-run queue - next        */
33 PCB *roylst[MAXPRI+2];      /* ready-to-run queue - last        */
34 PCB *running;               /* address of the running PCB       */
35 char *heapstart;            /* heap start address               */
36 char *heapend;              /* heap end address                 */
37 CT conn_tab[EVHI+1];        /* external event connect table     */
38 short suspended;            /* reschedule flag                  */
```

What is claimed is:

1. A method of communicating between processes in a data processing system comprising a plurality of processes grouped into one or more contexts, said method comprising the steps of:
   (a) providing each context with a table identifying the location of each of its constituent processes;
   (b) generating a request by a first process in one of said contexts to send a message to any process within said one context having the identical name as said first process, the location of said identically-named process within said context being unknown to said first process;
   (c) searching the table of said one context to determine whether any other identically-named process is located within said one context; and
   (d) if said one context contains any identically-named process, sending said message to said identically-named process.

2. A method of communicating between processes in a data processing system comprising a plurality of processes grouped into one or more contexts, said method comprising the steps of:
   (a) providing each context with a context process for providing access to the processes within said context;
   (b) providing each context process with a table identifying the location of each of its constituent processes;
   (c) generating a request by a first process in one of said contexts to send a message to any process within said one context having the identical name as said first process, the location of said identically-named process within said context being unknown to said first process; and
   (d) searching the table of the context process of said one context to determine whether said one context contains an identically-named process and, if so, sending said message to said identically-named process from the process which most recently received said message and identifying said identically-named process as having received said message.

3. The method of communicating between processes recited in claim 2, said method further comprising the steps of:
(e) repeating step (d) until all identically-named processes in said one context have received said message, including said first process.

4. The method of communicating between processes recited in claim 2 wherein said one context contains no identically-named process other than said first process, and wherein in step (d) said message is sent to said first process.

5. A data processing system comprising:
at least one processor,
a plurality of processes resident in at least one memory store, related ones of said processes being grouped into one or more contexts, and
means for communicating between said processes, said means comprising:
  storage means associated with each context for identifying the location of each of its constituent processes;
  means for generating a request by a first process in one of said contexts to send a message to any process within said one context having the identical name as said first process, the location of said identically-named process within said context being unknown to said first process;
  means for searching the storage means associated with said one context and indicating whether any identically-named process is located within said one context; and
  means response to said indicating means for sending said message to said identically-named process.

6. The data processing system recited in claim 5, wherein if said searching means indicates that said one context contains no identically-named process other than said first process, said sending means sends said message to said first process.

7. A data processing system comprising:
at least one processor,
a plurality of processes resident in at least one memory store, related ones of said processes being grouped into one or more contexts, each context having associated therewith a context process for providing access to the processes within said context, and
means for communicating between said processes, said means comprising:
  storage means associated with each context process for identifying the location of each of its constituent processes;
  means for generating a requires by a first process in one of said contexts to send a message to any process within said one context having the identical name as said first process, the location of said identically-named process within said context being unknown to said first process;
  means for searching the storage means of the context process associated with said one context and indicating whether any identically-named process is located within said one context; and
  means responsive to said indicting means for sending said message to said identically-named process.

8. The data processing system recited in claim 7, and further comprising:
  control means responsive to said searching means and to said sending means for causing them to repetitively search for any identically-named process located within said one context which has not received said message and, if found, to send said message to it, until said message has been sent to all identically-named processes within said one context, including said first process.

9. The data processing system recited in claim 8, wherein if said searching means indicates that said one context contains no identically-named process other than said first process, said control means sends said message to said first process.

10. A method of communicating between processes in a data processing system comprising a plurality of processes grouped into one or more contexts, said method comprising the steps of:
(a) generating a request by a first process in one of said contexts to send a message to any process within said one context having the identical name as said first process, the location of said identically-named process within said context being unknown to said first process; and
(b) if said one context contains any identically-named process, sending said message to said identically-named process.

11. The method of communicating between processes recited in claim 10, comprising the steps of:
(c) determining whether said one context contains an identically-named process which has not received said message, and, if so, sending said message to said identically-named process from the process which most recently received said message.

12. The method of communicating between processes recited in claim 11, said method further comprising the steps of:
(d) repeating step (c) until it is determined that all identically-named processes in said one context have received the message, including said first process.

13. The method of communicating between processes recited in claim 10 wherein said one context contains no identically-named process other than said first process, and wherein the step (b) said message is sent to said first process.

* * * * *